United States Patent [19]
Keefer

[11] Patent Number: 5,256,172
[45] Date of Patent: Oct. 26, 1993

[54] THERMALLY COUPLED PRESSURE SWING ADSORPTION

[76] Inventor: Bowie G. Keefer, 4324 W. 11th Ave., Vancouver, British Columbia, Canada, V6R 2M1

[21] Appl. No.: 870,322

[22] Filed: Apr. 17, 1992

[51] Int. Cl.$^5$ .......................................... B01D 53/04
[52] U.S. Cl. ........................................ 423/230; 95/99; 95/100; 95/103; 96/115; 96/125; 96/128; 96/130; 423/220
[58] Field of Search ................. 55/25, 26, 28, 33, 58, 55/62, 68, 74, 75, 161–163, 179, 267–269, 387, 389; 423/230, 244, 655

[56] References Cited

U.S. PATENT DOCUMENTS

| | | | |
|---|---|---|---|
| 3,221,476 | 12/1965 | Meyer | 55/28 |
| 4,312,851 | 1/1982 | Isalski et al. | 55/25 X |
| 4,392,871 | 7/1983 | Almlöf et al. | 55/25 X |
| 4,614,525 | 9/1986 | Reiss | 55/25 |
| 4,671,893 | 6/1987 | Pinto | 55/26 X |
| 4,695,442 | 9/1987 | Pinto et al. | 55/25 X |
| 4,702,903 | 10/1987 | Keefer | 55/28 X |
| 4,732,579 | 3/1988 | Veltman et al. | 55/26 X |
| 4,793,832 | 12/1988 | Veltman et al. | 55/26 X |
| 4,801,308 | 1/1989 | Keefer | 55/28 X |
| 4,816,121 | 3/1989 | Keefer | 55/28 X |
| 4,915,711 | 4/1990 | Kumar | 55/26 |
| 4,954,146 | 9/1990 | Garrett et al. | 55/58 X |
| 4,968,329 | 11/1990 | Keefer | 55/25 |
| 5,015,272 | 5/1991 | Okada et al. | 55/26 |
| 5,082,473 | 1/1992 | Keefer | 55/28 X |
| 5,096,469 | 3/1992 | Keefer | 55/28 X |
| 5,104,426 | 4/1992 | Yamada et al. | 55/58 X |
| 5,112,590 | 5/1992 | Krishnamurthy et al. | 55/25 X |
| 5,133,785 | 7/1992 | Kumar et al. | 55/26 |
| 5,152,812 | 10/1992 | Kovach | 55/62 X |

*Primary Examiner*—Robert Spitzer

[57] ABSTRACT

Pressure swing adsorption separation of a gas mixture is performed in an apparatus with a plurality of adsorbent beds cooperating to exchange energy from an adsorbent bed undergoing a depressurization step to an adsorbent bed undergoing a pressurization step, and with provision for thermal coupling in order to improve process efficiency. Thermal coupling is provided as heating to augment expansion energy recovery, and as a temperature gradient imposed in adsorbent beds to provide the function of a thermal regenerator in a regenerative thermodynamic cycle. The invention provides improved techniques for recovery of expansion energy in pressure swing adsorption, and for direct application of thermal energy to power pressure swing adsorption processes.

43 Claims, 12 Drawing Sheets

THERMALLY COUPLED PRESSURE SWING ADSORPTION

TECHNICAL FIELD

The invention relates to separations conducted by pressure swing adsorption.

BACKGROUND ART

Gas separation by pressure swing adsorption is achieved by coordinated pressure cycling and flow reversals over adsorbent beds which preferentially adsorb a more readily adsorbed component relative to a less readily adsorbed component of the mixture. The total pressure is elevated to a higher pressure during intervals of flow in a first direction through the adsorbent bed, and is reduced to a lower pressure during intervals of flow in the reverse direction. As the cycle is repeated, the less readily adsorbed component is concentrated in the first direction, while the more readily adsorbed component is concentrated in the reverse direction.

The conventional process for gas separation by pressure swing adsorption uses two or more adsorbent beds in parallel, with directional valving at each end of each adsorbent bed to connect the beds in alternating sequence to pressure sources and sinks, thus establishing the changes of working pressure and flow direction. Enhanced separation performance is achieved in well known PSA cycles using steps for each adsorbent bed of cocurrent feed at the higher cycle pressure cocurrent initial blowdown, countercurrent final blowdown, countercurrent purge at the lower cycle pressure, and countercurrent pressurization. Conventional pressure swing adsorption processes make inefficient use of applied energy, because of irreversible expansion over the valves while switching the adsorbent beds between higher and lower pressures. As disclosed by Kiyonaga (U.S. Pat. No. 3,176,444), Wagner (U.S. Pat. No. 3,430,418) and Fuderer (U.S. Pat. No. 3,986,849), improved efficiency and product yield can be obtained with more than two adsorbent beds operating in parallel, by performing pressure equalization steps between the separate beds so that a first bed undergoing a pressure reduction step exchanges gas which typically has been substantially purified to a second bed undergoing a pressure increase step so that the working pressure of the first and second beds is equalized to a pressure intermediate between the high and low pressures of the cycle. Thus, a cocurrent blowdown step of one bed achieves a countercurrent pressurization step in another bed when the product ends of the beds are connected during a pressure equalization step. This pressure equalization technique achieves partial recovery of bed expansion energy, although irreversible expansion still takes place over a smaller pressure interval. With a greater number of beds, multiple pressure equalization steps can be achieved, although the valve logic and controls are often greatly complicated.

Devices with simplified logic for achieving pressure equalization steps between multiple adsorbent beds have been disclosed by Van Weenen (U.S. Pat. No. 4,469,494) and by Mattia (U.S. Pat. No. 4,452,612) using a rotary adsorbent bed assembly whose multiple elements sweep past fixed ports for feed admission, product delivery and pressure equalization.

The prior art also includes the following pressure swing adsorption devices with cyclically operated volume displacement means such as reciprocating pistons communicating with one or both ends of an adsorbent bed, to generate pressure changes internally and thus improve energy efficiency. Pressure swing adsorption devices with pistons only at the feed end of the adsorbent bed are disclosed by Broughton (U.S. Pat. No. 3,121,625), Wilson (U.S. Pat. No. 3,164,454), Rutan (U.S. Pat. No. 3,236,028), Eriksson (U.S. Pat. No. 4,169,715) and Izumi et al (U.S. Pat. No. 4,948,401). Keller (U.S. Pat. No. 4,354,859) and my U.S. Pat. Nos. 4,702,903, 4,801,308, 4,816,121, 4,968,329, 5,082,473 and 5,096,469) have disclosed pressure swing adsorption devices with cyclic volume displacement means, operating at the same frequency and in general different phase, communicating with both ends of an adsorbent bed.

My U.S. Pat. No. 4,702,903 uses reciprocating volume displacement means coupled to an adsorbent bed, with a temperature gradient imposed on the adsorbent bed which also serves as a thermal regenerator, so that heat may be applied to assist driving the process through a regenerative thermodynamic cycle analogous to the Stirling cycle. Thus, heat is applied directly as an energy source to perform gas separations. Extensions of this principle are further developed in my U.S. Pat. No. 4,816,121 concerned with separation of chemically reactive gases, my U.S. Pat. No. 4,968,329 with scavenging valve logic means to provide large exchanges of fresh feed gas for depleted feed gas, and my U.S. Pat. No. 5,096,469) with inertial energy exchange between gas separation modules.

The present invention is related to concurrently filed U.S. patent application "Pressure Swing Adsorption Apparatus".

DISCLOSURE OF INVENTION

Pressure swing adsorption processes, including that of the present invention, involve cyclic energy transfers to achieve the following functions for each of a plurality of adsorbent beds operated in parallel:

(1) pressurize the adsorbent bed from the lower to the higher pressure of the cycle, (2) introduce feed gas to the adsorbent bed, usually at the higher pressure, (3) depressurize the adsorbent bed from the higher to the lower pressure, (4) generate flow in the adsorbent bed in opposite directions at the higher and lower pressure.

(5) expand a portion of the light component product as reflux gas, and compress a portion of the heavy component product as reflux gas to the adsorbent bed.

In the present invention, above energy transfer functions (1) and (3) are achieved by energy transfer between adsorbent beds, either by mechanical energy associated with cyclic volume displacement means compressing or expanding the gases in the adsorbent beds directly, or by valved gas exchanges between the beds. Gas exchanges between the beds may be pressure modulated (i.e., by a mechanical device to accept gas and expansion energy as the pressure reduces in a bed during a depressurization step, and then to deliver gas and compression energy as the pressure increases in the bed during a pressurization step across substantially the same pressure interval) to achieve enhanced efficiency compared to prior art pressure equalization techniques. Additionally, the flow pattern in the adsorbent bed may be flow modulated during pressurization and depressurization steps, further enhancing process yield and performance.

The above energy transfer functions (2), (4) and (5) are achieved in preferred embodiments by mechanically coupled compressor and expander combinations, with thermal coupling through heat exchangers to augment expansion energy and thus reduce the net compression power load. The adsorbent beds function as thermal regenerators in a regenerative thermodynamic power cycle, so that the gas separation process may in part be thermally powered.

The invention provides a process for separating first and second components of a gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency defining a cycle period; providing for the process a plurality of adsorbent beds of the adsorbent material with said adsorbent beds having first and second ends; conducting the process sequentially in a number "N" of substantially similar adsorbent beds at the same cyclic frequency but in different phases separated by a fraction "1/N" of the cycle period; and the process including in each adsorbent bed the cyclically repeated steps at the cyclic frequency and in some sequence of:

(a) introducing the gas mixture to the adsorbent bed, (b) generating cyclic pressure changes in the adsorbent bed, in a pressurization step increasing the working pressure of the adsorbent bed, and in a depressurization step decreasing the working pressure of the adsorbent bed, thus changing the working pressure of the adsorbent bed between the lower and higher pressures, (c) generating cyclically reversing flow of the gas mixture in the adsorbent bed, while establishing a relative phase between the reversing flow and the said pressure changes in the adsorbent bed, (d) generating gas flow in the adsorbent bed directed toward the first end of the adsorbent bed when the pressure is approximately the lower pressure, so that a first product gas enriched in the first component flows from the first end of the adsorbent bed at substantially the lower pressure, (e) generating gas flow in the adsorbent bed directed toward the second end of the adsorbent bed when the pressure is approximately the higher pressure, so that a second product gas enriched in the second component flows from the second end of the adsorbent bed at substantially the higher pressure, and the process is further characterized by:

(f) recovering energy from a depressurization step of the adsorbent bed to assist performing the pressurization step of another of the adsorbent beds, (g) collecting as second product reflux gas a portion of the second product gas which has flowed from the second ends of the "N" adsorbent beds in above step (e) for each of the adsorbent beds, providing heat to the second product reflux gas at substantially the higher pressure, expanding the second product reflux from the higher to the lower pressure, and admitting the second product reflux gas to the second end of an adsorbent bed during step (d) for that adsorbent bed, (h) recovering expansion energy from above step (g) in order to provide compression energy for the process.

(i) maintaining the first end of the adsorbent bed at substantially a first temperature, and the second end of the adsorbent bed at substantially a second temperature.

To maintain the first end of the adsorbent bed at the first temperature, heat must be removed from adjacent the first end of the adsorbent bed. To maintain the second end of the adsorbent bed at the second temperature, heat must be removed from adjacent the second end of the adsorbent beds, e.g. by heating gas which has been extracted from adjacent the second ends and then returning that gas to adjacent the second ends.

To perform the gas separation, the invention provides an apparatus including:

(a) a plurality of "N" substantially similar adsorbent beds of the adsorbent material, each adsorbent bed having a first end and a second end of the flow path, (b) feed supply means to introduce the gas mixture to each of the said adsorbent beds, (c) means to generate cyclic pressure changes in each adsorbent bed at a cyclic frequency, in a pressurization step increasing the working pressure of the adsorbent bed, and in a depressurization step decreasing the working pressure of the adsorbent bed, so as to change the working pressure of the adsorbent bed between the lower and higher pressures, (d) means to generate cyclically reversing flow of the gas mixture in each adsorbent bed at the cyclic frequency, cooperating with the means to generate cyclic pressure changes so as to establish a relative phase between the reversing flow and the pressure changes in each adsorbent bed; and means to generate gas flow in each adsorbent bed directed toward the first end of the adsorbent bed when the pressure is approximately the lower pressure, (e) means to generate gas flow in each adsorbent bed directed toward the second end of the adsorbent bed when the pressure is approximately the higher pressure, (f) first product valve means to remove a first product gas enriched in the first component from adjacent the first end of each adsorbent bed, and second product valve means to deliver a second product gas enriched in the second component from adjacent the second end of the adsorbent bed.

(g) first inlet valve means to admit gas to the first end of each adsorbent bed at substantially the higher pressure, and second inlet valve means to admit gas to the second end of each adsorbent bed at substantially the lower pressure, and the apparatus is further characterized by:

(h) work energy exchange means to recover energy from a depressurization step of an adsorbent bed to assist performing the pressurization step of another of the adsorbent beds, (i) means to provide heat to a second product reflux gas at substantially the higher pressure, the second product reflux gas being a portion of the second product gas delivered from the second product valve means, (j) expander means to expand the second product reflux gas to which heat has been provided from substantially the higher to the lower pressure, (k) compressor means cooperating with the first ends of the adsorbent beds, and cooperating with the work energy exchange means and the expander means to establish a pressure ratio between the higher and lower pressures, (l) means to recover mechanical power from the expander means to assist driving the compressor means.

(m) means to establish the first end of the bed at substantially a first temperature, and the second end of the bed at substantially a second temperature.

The driving energy for the process can be provided mechanically, or by supplying the feed gas at an elevated pressure relative to the delivery pressure of a product or exhaust gas, or by supplying low grade heat to maintain a temperature gradient in the gas working space so that the apparatus is directly powered in part by a regenerative heat engine thermodynamic cycle. This regenerative thermodynamic cycle will work between substantially the temperature at which heat is provided to the second product reflux gas and the first temperature. Owing to adiabatic cooling in the expander means, the temperature at which heat is provided to the second product reflux gas may exceed the second temperature, at the second end of the adsorbent bed.

Product delivery valves and valve control means are incorporated in the product delivery means, to control the mass flow rates of the heavy and light products so that desired high purity and recovery of the heavy and light components in respectively the heavy and light products is achieved.

Various embodiments of the present invention may be used to separate chemically reactive gas mixtures, working at reaction temperature. The second ends of the adsorbent beds may be operated at high temperatures in applications where suitable adsorbents (such as zeolite or alumina gel) are available with adequate selectivity and uptake. Where separation at high temperatures of chemically reactive gases is desired, the chemical reaction may be performed in the hot zone of the adsorbent bed (which may contain a catalyst admixed with the adsorbent, or a catalytically active adsorbent) or in the higher pressure manifold as a reaction space. If the chemical reaction is exothermic (as for example an oxidation reaction, or a hydrogenation reaction such as ammonia synthesis), reaction heat is provided to the apparatus internally, thus unloading the heat exchangers 43 and 51. If the reaction is endothermic (as for example a dehydrogenation reaction such as ammonia or hydrogen sulphide dissociation), the necessary heat must be provided to the reaction space.

The more readily adsorbed fraction and heat are pumped to the first ends of the adsorbent beds, while the less readily adsorbed fraction is pumped to the second end of the adsorbent beds from which heat is pumped. It is desirable to conduct a reaction in a zone of the apparatus selected so that the reactant(s) will be retained in the reaction space until the reaction has proceeded to completion, while the product(s) are separated away so as to enhance the reaction rate and yield. Thus, the present gas separation process will concentrate the reactant(s) in the reaction space, while reducing the concentration of the product(s) in the reaction space.

If the product(s) is more readily adsorbed than the reactant(s), the reaction space will be located adjacent the second ends of the adsorbent beds so that the reactant(s) is trapped in the reaction space while the product(s) is separated to the first end of the adsorbent beds. Heat generated adjacent the second ends by an exothermic reaction will be recovered in thermally powering the apparatus.

If the product(s) is less readily adsorbed than the reactant(s), the reaction space will be located adjacent the first ends of the adsorbent beds so that the reactant(s) is trapped in the reaction space while the product(s) is separated to the first end of the adsorbent beds. An endothermic reaction conducted there will absorb heat pumped to the first ends by the thermodynamic cycle of the present invention.

If the reaction has a first product more readily adsorbed than the reactant(s) and a second product less readily adsorbed than the reactant(s), the reaction space will be located intermediately between the first and second ends of the adsorbent beds, so that the products will be separated to the first and second ends respectively.

MODES FOR CARRYING OUT THE INVENTION

FIG. 1

A pressure swing adsorption apparatus 1 has an adsorption module 2. The adsorption module 2 includes a number "N" of substantially similar adsorbent beds, and adsorbent bed work exchange means. The "N" adsorbent beds are operated in a pressure swing adsorption cycle at a cyclic frequency characterized by a period "T", and in different phases so as to reduce fluctuations in feed and product flows to and from the adsorption module.

Figure 1:
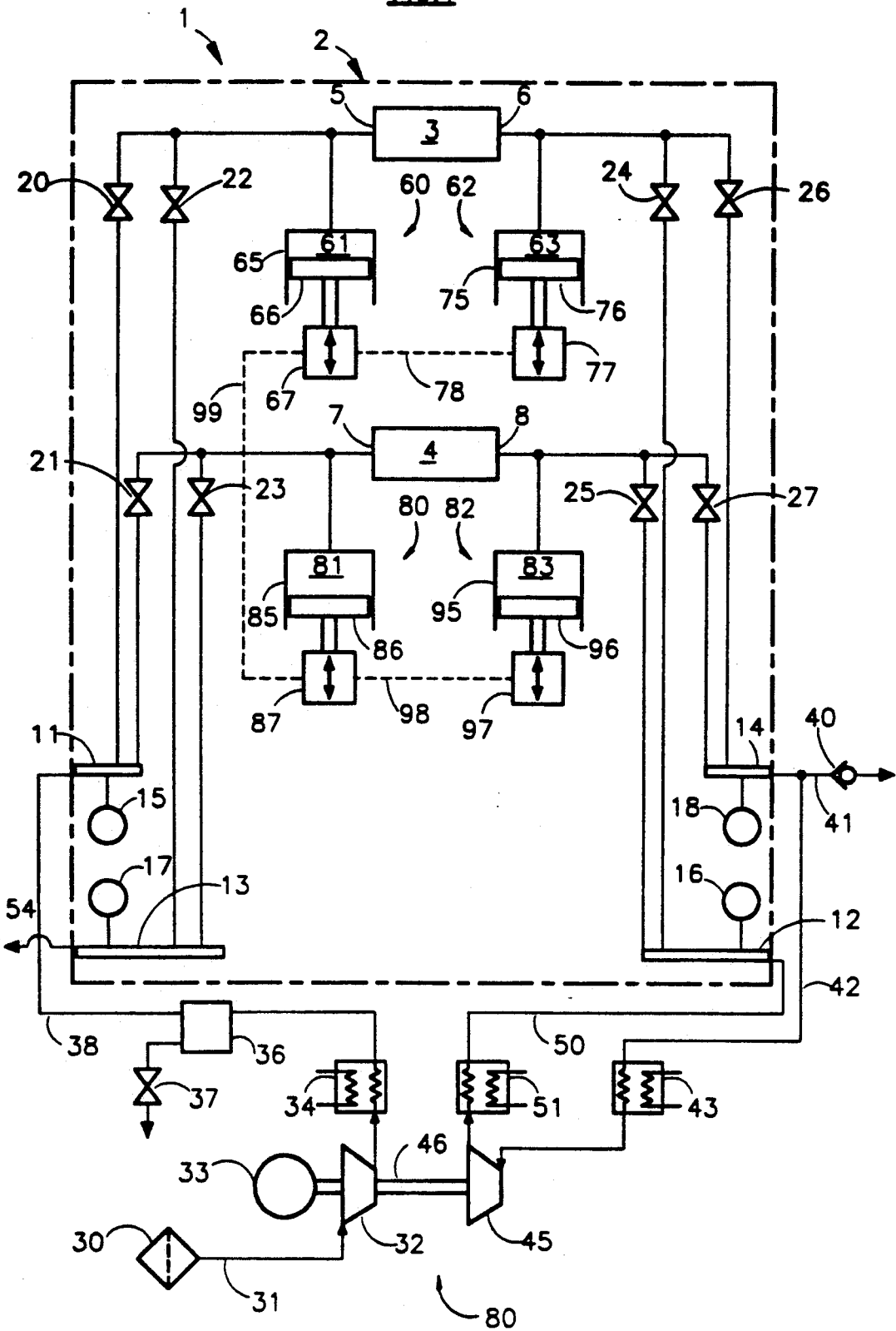
FIG. 1 is a simplified schematic of a pressure swing adsorption apparatus, whose work exchange means has reciprocating pistons at first and second ends of the adsorbent beds.
Figure 2:
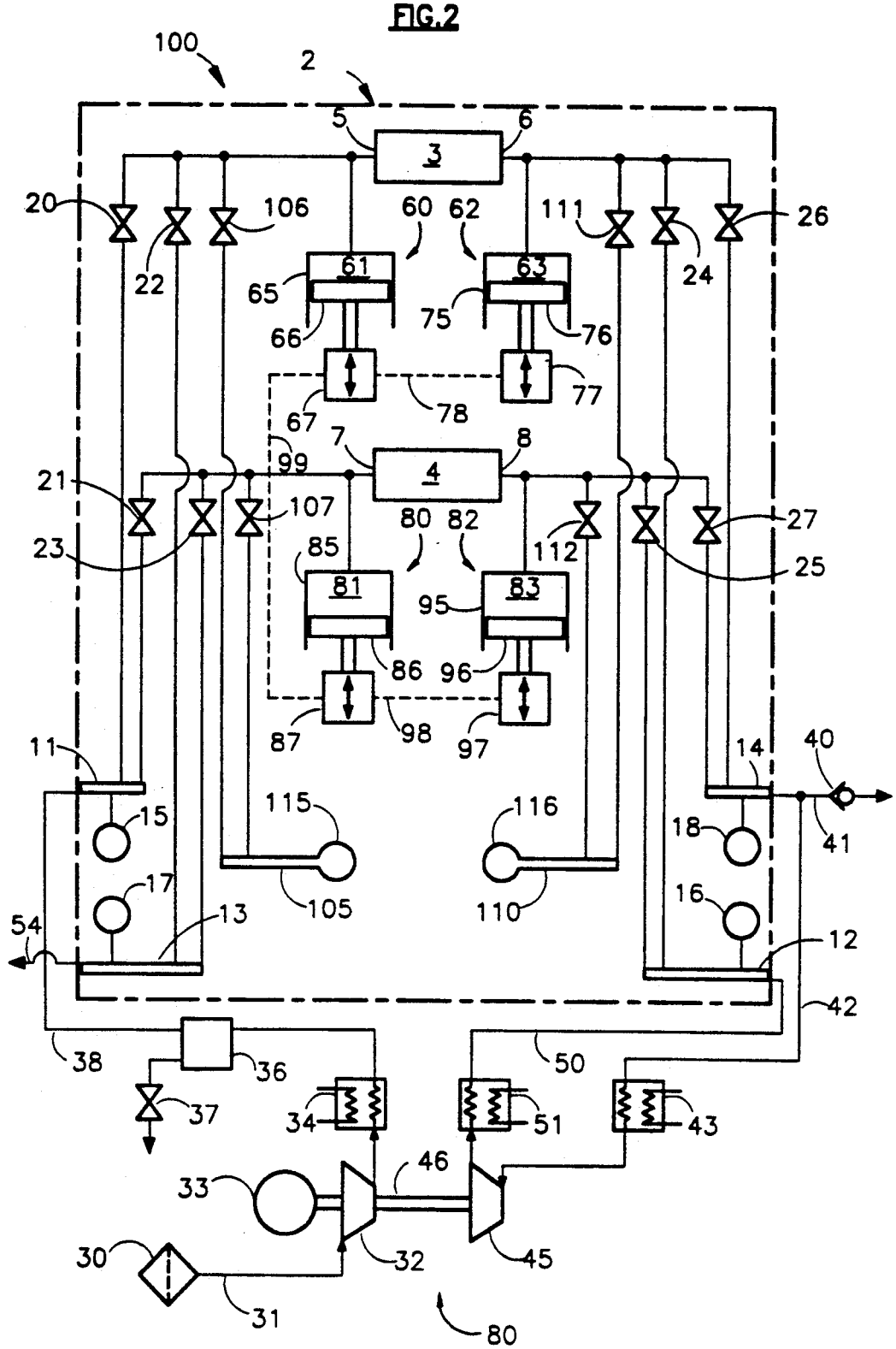
FIG. 2 shows pressure equalization valves included in the work exchange means.
Figure 3:
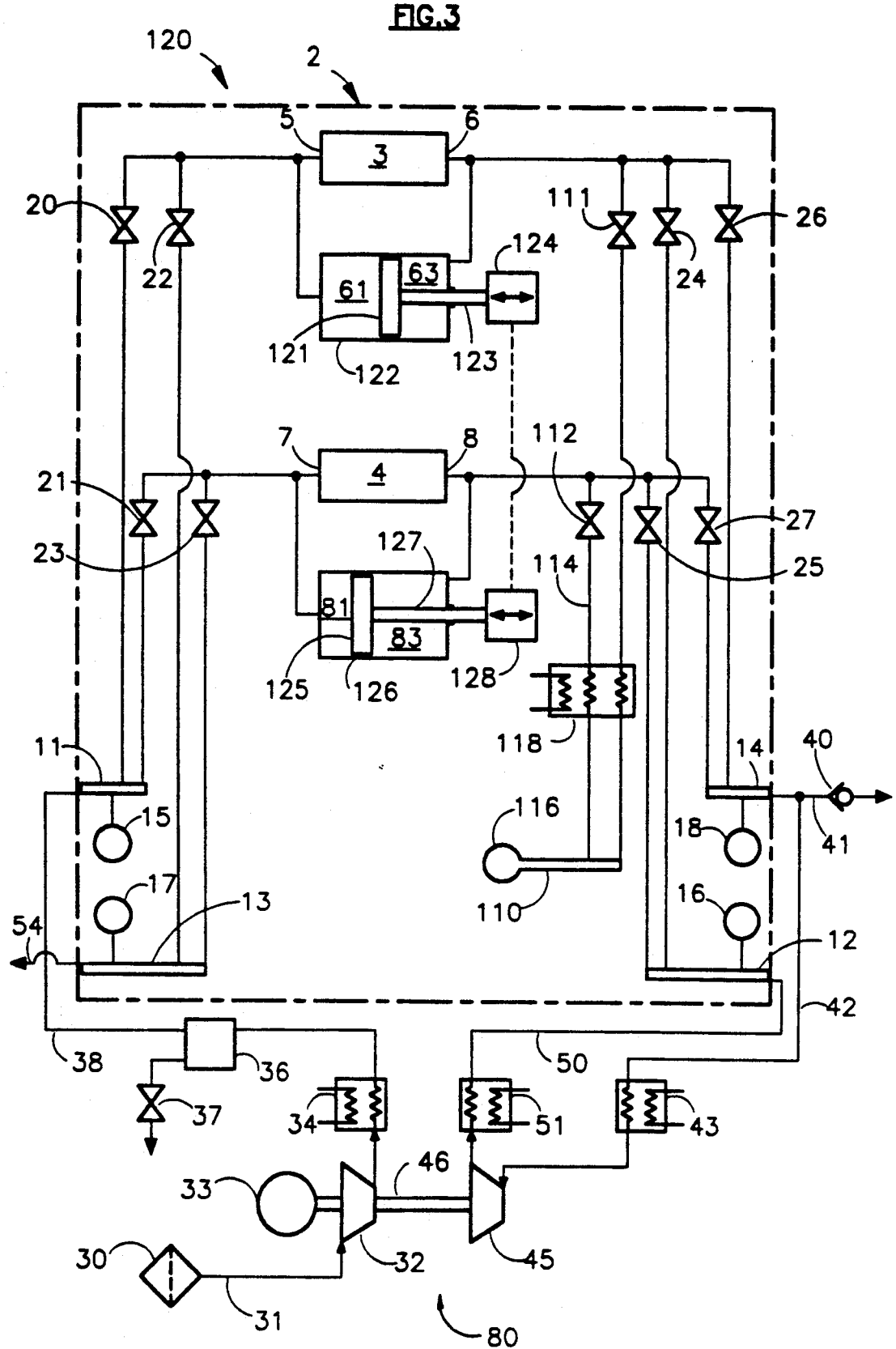
FIG. 3 shows an apparatus using displacer pistons.
Figure 4:
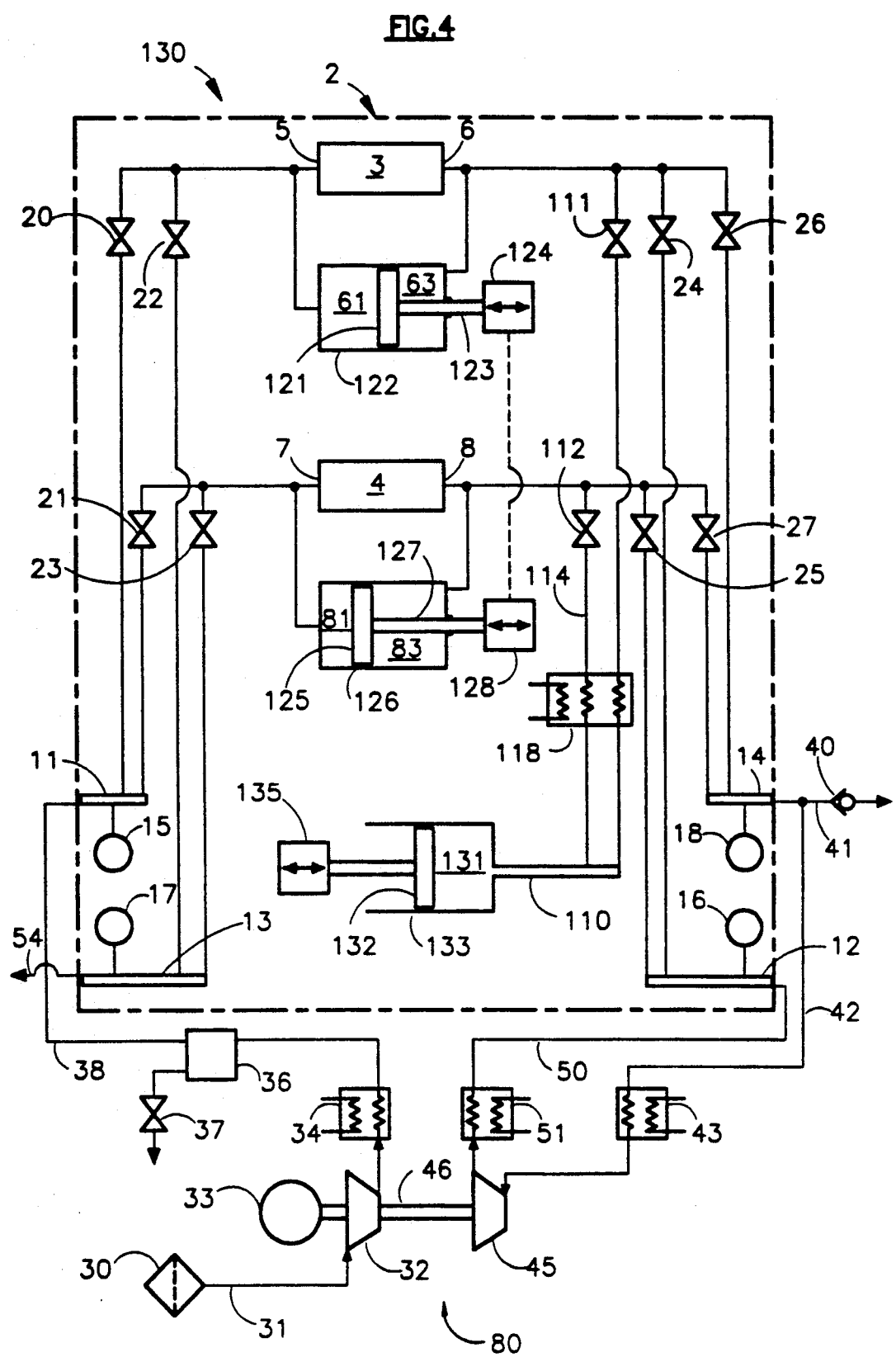
FIG. 4 shows an apparatus with a pressure modulation pump for work exchange.
Figure 5:
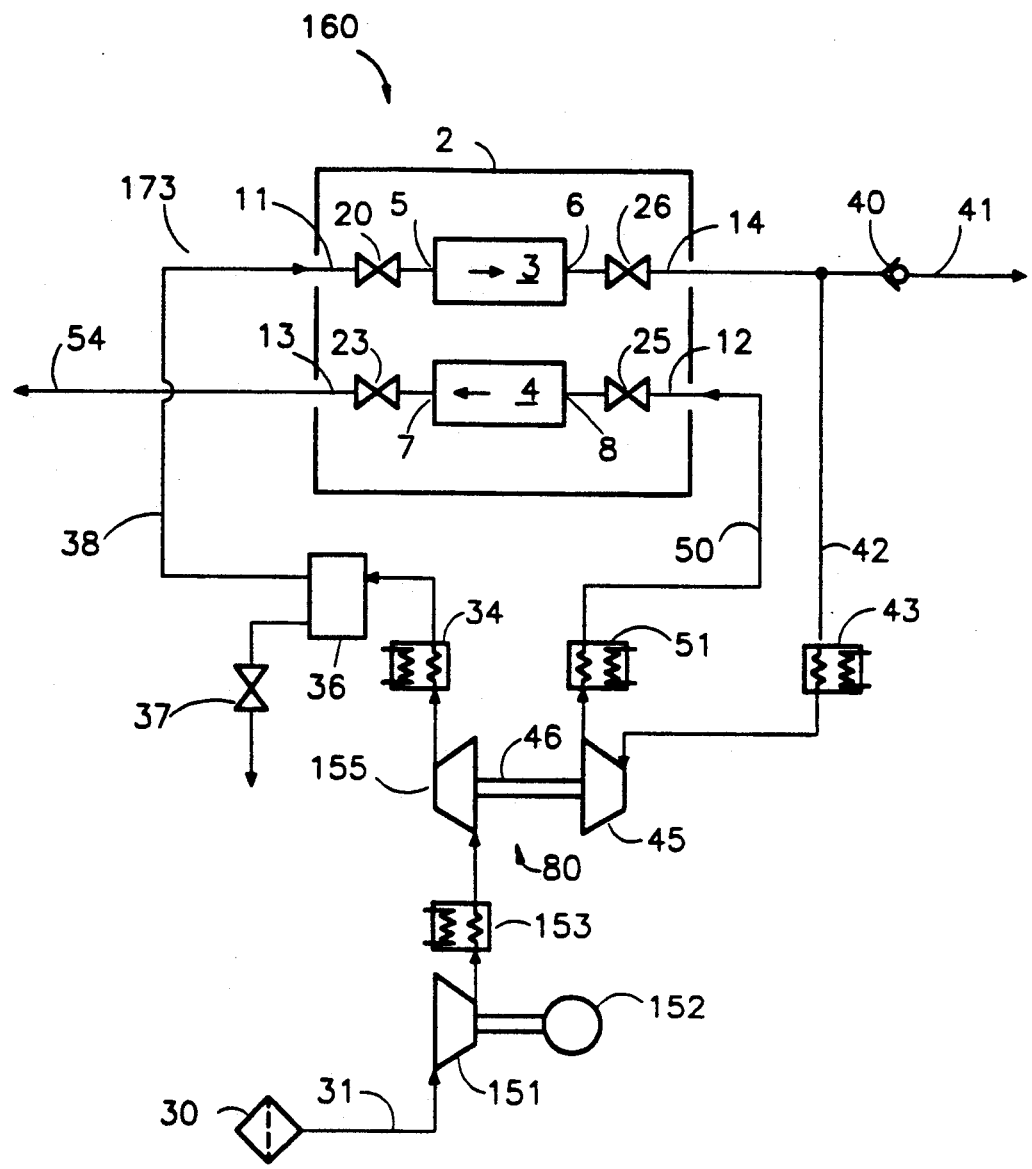
FIG. 5 shows a apparatus with two stage compression.
Figure 6:
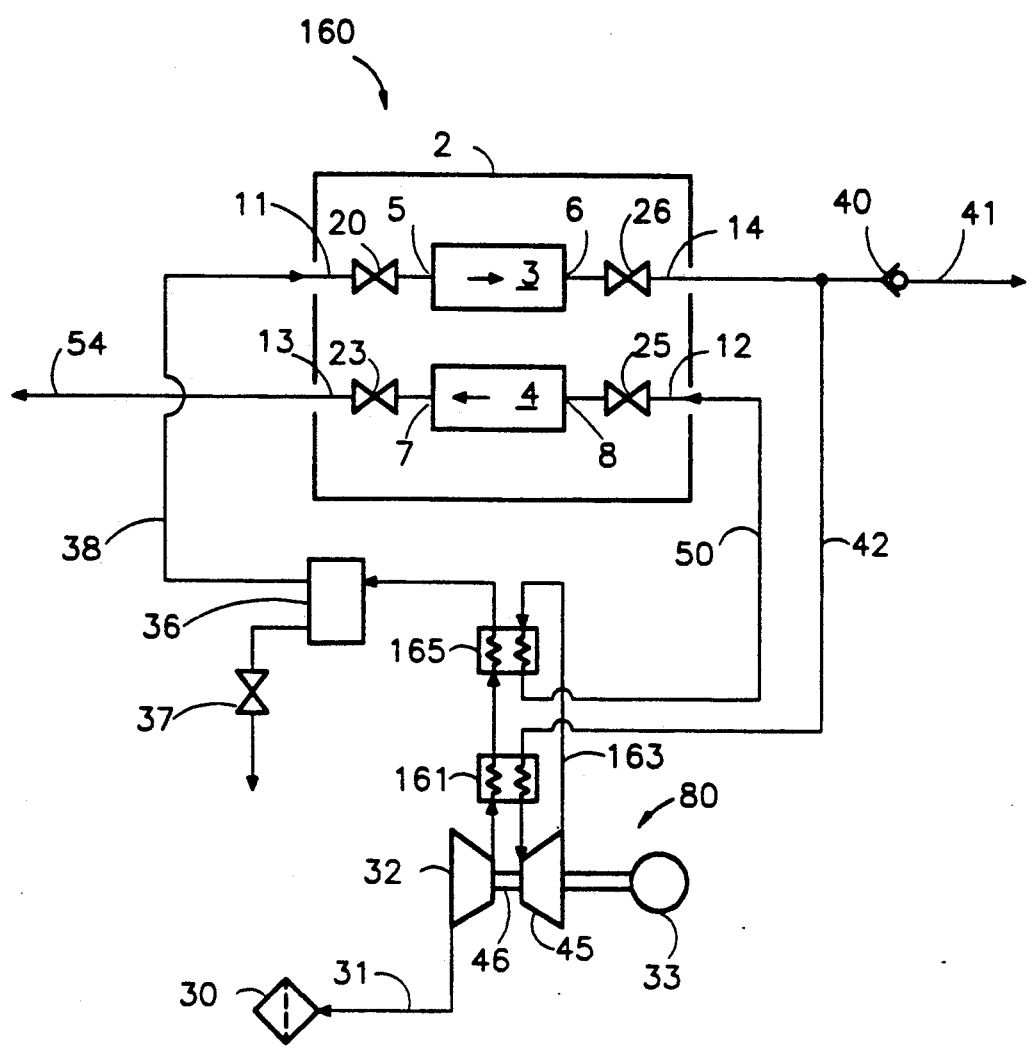
FIG. 6 is a simplified schematic of pressure swing adsorption apparatus with internal recovery of heat of compression.
Figure 7:
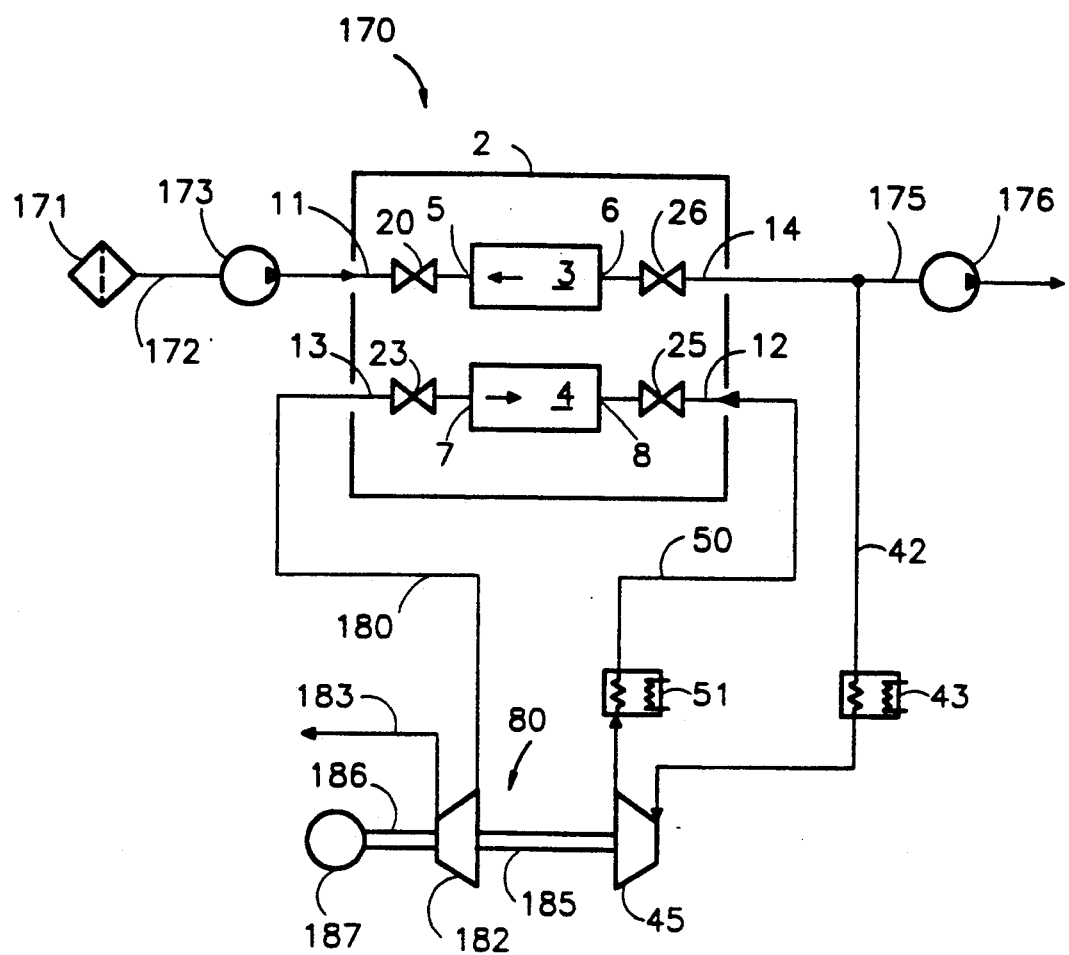
FIG. 7 is a simplified schematic of a vacuum swing adsorption apparatus suitable for air purification or oxygen enrichment.

The number "N" of adsorbent beds working in parallel and in sequenced phase is at least two, and is preferably greater. A large number "N" enables smooth operation with minimal flow pulsations. In FIG. 1, the adsorption module is depicted with only two adsorbent beds for simplicity, but it will be understood that additional adsorbent beds may be provided in parallel.

The adsorption module 2 includes a first adsorbent bed 3 and a second adsorbent bed 4. Each of the adsorbent beds may comprise multiple adsorbent bed segments in series. Adsorbent bed 3 has a first end 5 and a second end 6, and adsorbent bed 4 has a first end 7 and a second end 8. The adsorption module includes a first inlet manifold 11, a second in let manifold 12, a first product manifold 13 and a second product manifold 14; with optional surge chambers 15, 16, 17, and 18 respectively connected to the manifolds. First inlet manifold 11 communicates by first inlet valves 20 and 21 respectively to the first ends 5 and 7 of the adsorbent beds, to which the first product manifold 13 also communicates by first product valves 22 and 23 respectively. Second inlet manifold 12 communicates by second inlet valves 24 and 25 to the second ends 6 and 8 of the adsorbent beds, to which the second product manifold 14 also communicates by second product valves 26 and 27 respectively.

Apparatus 1 includes an inlet 30 and feed supply conduit 31 supplying the feed gas mixture at a feed supply pressure to a feed compressor 32 driven by motor 33. The feed gas mixture is compressed to substantially the higher pressure of the pressure swing adsorption cycle by feed compressor 32 and is then cooled by cooler 34. Cooler 34 is means to remove heat from adjacent the first ends of the adsorbent beds, and thus to establish a first temperature as substantially the temperature of the first ends of the adsorbent beds. Any condensate may be removed in optional condensate separator 36 with drain valve 37, before the gas mixture is admitted by conduit 38 to first inlet manifold 11.

The gas mixture is introduced through first inlet valves 20 or 21 to the first end of the adsorbent beds, thus generating flow in the adsorbent bed directed toward the second end at substantially the higher pressure. A flow of second product gas enriched in the less readily adsorbed second component is delivered through the second product valves 26 or 27 into second product manifold 14. A portion of the second product gas reaching the second product manifold is used as second product reflux ga to purge the adsorbent beds, while the balance is delivered as a useful product at approximately the higher pressure through second product delivery valve 40 and delivery conduit 41. The second product reflux gas is withdrawn from second product manifold 14 at substantially the higher pressure by conduit 42 communicating to heater 43, and thence to expander 45.

Expander 45 expands the second product reflux gas from substantially the higher pressure to the lower pressure, while also cooling the second product reflux gas by approximately adiabatic expansion. Expander 45 is coupled mechanically to compressor 32 by shaft 46, in order to assist motor 33. The enthalpy of the second product reflux gas, and hence the mechanical power recovered by expander 45 to drive the second stage compressor 32, is increased according to the elevated temperature to which heater 43 has heated the second product reflux gas.

The second product reflux gas, having been depressurized and cooled by expander 45, is conveyed by conduit 50 through a reheat heater 51 to second inlet manifold 12. Heater 51 may be used to warm the reflux gas so that the second end of the adsorbent beds will not be cooled by expander 45. Heater 51, cooperating with heater 43 and the expander, is means to provide heat to adjacent the second ends of the adsorbent beds, and thus to establish the temperature of the second ends of the adsorbent beds at substantially a second temperature. Heater 51 may be used at a higher temperature to reheat the reflux gas, so as to raise the temperature of the second ends of the adsorbent beds, and thus to establish an axial temperature gradient in the adsorbent beds with the second ends at a higher temperature than the first ends of the adsorbent beds.

The second product reflux gas in second inlet manifold 12 is admitted to the second ends 6 and 8 of the adsorbent beds by second inlet valves 24 and 25, and thus generates flow in the adsorbent bed at the lower pressure directed to the first ends of the adsorbent beds. A first product gas enriched in the more readily adsorbed first component is delivered from first product valves 22 or 23 to first product manifold 13, and is discharged thence and from the apparatus by conduit 54.

The adsorption module 2 includes adsorbent bed work exchange means to exchange compression energy from a bed undergoing a depressurization step to a bed undergoing a pressurization step. The adsorbent bed work exchange means to be described will recover most of the energy required to pressurize the adsorbent beds from the depressurization of the adsorbent beds. The work exchange means most generally includes cyclic volume displacement means such as pistons communicating with first and second ends of each adsorbent bed, and also pressure equalization valves communicating between first and second ends of each adsorbent bed and intermediate pressure manifolds. The adsorption module may also include means to compress or expand gas streams entering or exiting the adsorption module.

Cooperating with adsorbent bed 3, a first cyclic volume displacement means 60 changes the volume of first space or chamber 61 communicating with the first end 5 of the bed, and a second cyclic volume displacement means 62 changes the volume of second space or chamber 63 communicating with the second, end 6 of the bed. The volume of first space or chamber 61 in cylinder 65 is changed by piston 66 reciprocated by drive means 67. The volume of second space or chamber 63 in cylinder 75 is changed by piston 76 reciprocated by drive means 77, coupled to drive means 67 by linkage 78.

Likewise, cooperating with adsorbent bed 4, a first cyclic volume displacement means 80 changes the volume of first space or chamber 81 communicating with the first end 7 of the bed, and a second cyclic volume displacement means 82 changes the volume of second space or chamber 83 communicating with the second end 8 of the bed. The volume of first space or chamber 81 in cylinder 85 is changed by piston 86 reciprocated, by drive means 87. The volume of second space or chamber 83 in cylinder 95 is changed by piston 96 reciprocated by drive means 97, coupled to drive means 87 by linkage 98. Linkages 78 and 98 may cooperate through linkage 99 and with the valves to establish a phase relation between the process conducted in the "N" adsorbent beds, so that the process is conducted in the adsorbent beds in different phases separated by a fraction "1/N" of the cycle period defined by the cycle frequency. Linkage 99 provides means for exchange of compression and expansion work between adsorbent beds, and may also include means for inertial storage of energy.

The first and second cyclic volume displacement means of each adsorbent bed may be operated at a frequency and with displacements and relative phase determined by the drive means and linkage. With the first and second cyclic volume displacement means operated at the cyclic frequency of the process, their in-phase volume changes will act to change the working pressure of the adsorbent bed (when the first and second inlet and product valves are closed to isolate the adsorbent bed from the first and second inlet and product manifolds). The drive means between different adsorbent beds may be coupled mechanically or hydraulically to exchange energy from depressurization of one bed to pressurize another bed.

The out-of-phase volume changes of the first and second volume displacement means will act to generate flow in the adsorbent bed between its first and second ends. In important embodiments of the present invention, the first and second volume displacement means are operated 180° out-of-phase, and may then be combined in a double-acting "displacer" cylinder.

The apparatus may be simplified to have only the first cyclic volume displacement means (in which case there is substantially zero flow at the second end of the bed during pressurization and depressurization steps), or only the second cyclic volume displacement means (in which case there is substantially zero flow at the first end of the bed during pressurization and depressurization steps). If both first and second cyclic volume displacement means are included, they may be operated with volume variations in phase, or with volume variations in the second cyclic volume displacement means having a leading phase with respect to volume variations in the first cyclic volume displacement means. The latter option provides a desirable flow pattern during pressurization and depressurization steps, but with larger displacements required to achieve the same pressurization and depressurization duty.

An important aspect of the present invention, expressed in each embodiment illustrated, is the mechanical integration of the expander 45 and compressor 32, with cooperating heat exchangers 34 and 43, into a compression/expansion combination 80, which may use industrial gas turbine components. It will be evident that a plurality of adsorption modules 2 could be connected in parallel to a single compression/expansion module 80, thus providing enhanced economies of scale for larger installations. The process is thus similar to a regenerative gas turbine cycle, with the adsorbent beds in the role of thermal regenerators, and with the most important distinction that means is provided within the adsorbent module to exchange compression and expansion energy between the adsorbent beds or thermal regenerators, independently of the compression/expansion module. This feature is an important improvement over regenerative gas turbines using e.g. rotary regenerators, as compression energy of interstitial gas within the regenerator matrix has been dissipated by free expansion during the pressure changes.

Apparatus 1 may be applied to concentrate oxygen from atmospheric air, using a zeolite adsorbent on which nitrogen is more readily adsorbed than oxygen at ambient and moderately elevated temperatures. Suitable adsorbents include zeolite 10X or chabazite. The lower pressure is then slightly above atmospheric pressure, and the higher pressure is elevated to about two or three atmospheres. Water vapour is condensed and removed in separator 36. If the higher pressure is about 2.5 atmospheres, the second ends of the adsorbent beds are maintained at a second temperature of about 60° C., and heater 51 is omitted, the second product reflux gas may be heated to a temperature of about 160° C. so that the expander exit temperature is about 60° C. Alternatively, heater 51 might be included to elevate the second temperature to about 100° C. The mechanical power required to drive the apparatus by motor 33 may then be reduced to less than 100 kWh per ton of oxygen produced at 90% to 95% purity, subject to selection of efficient compressor and expander machines.

FIG. 1

As illustrated in embodiment 100, the adsorbent bed work exchange means may also (or alternatively) include pressure equalization means including valves for equalizing the pressure of pairs of adsorbent beds, or for equalizing the pressure of one adsorbent bed with an intermediate pressure manifold which will then be equalized with another adsorbent bed. Such pressure equalization steps may be performed at the first ends, the second ends or at intermediate points of the adsorbent beds. Embodiment 100 is shown with pressure equalization means at both first and second ends of the adsorbent beds, with an intermediate pressure manifold at a pressure intermediate between the higher and lower pressure of the cycle. A first intermediate pressure manifold 105 communicates by equalization valves 106 and 107 to the first ends 5 and 7 respectively of the adsorbent beds. A second intermediate pressure manifold 110 communicates by equalization valves 111 and 112 via conduits 113 and 114 to the second ends 6 and 8 respectively of the adsorbent beds. Heat exchanger 118 is provided to heat conduits 113 and 114, so as to heat the second ends of the adsorbent beds. Surge chambers 115 and 116 may be provided in the intermediate pressure manifolds, and would be necessary if the equalization is performed in a first step from an adsorbent bed to the intermediate pressure manifold with the surge absorber in the capacity of a tank, and then in a second step to another adsorbent bed at lower pressure.

FIG. 3

In embodiment 120, the first and second cyclic volume displacer means are operated 180° out of phase, and for mechanical simplicity are combined as displacer means. For adsorbent bed 3, a displacer means is provided by displacer piston 121 in displacer cylinder 122, and with displacer rod 123 coupled to reciprocating drive means 124. Similarly, displacer means for adsorbent bed 4 is provided by displacer piston 125 in displacer cyclinder 126, and with displacer rod 127 coupled to reciprocating drive means 128, coupled to drive means by coordinating linkage 129. It will be evident that the displacers could use diaphragms instead of pistons.

Embodiment 120 also illustrates pressure equalization only from the second ends of the adsorbent beds. With more adsorbent beds, a plurality of intermediate pressure manifolds operating at different intermediate pressures between the higher and lower cycle pressures could be provided.

The displacers provide means for flow modulation in the adsorbent beds during pressurization and depressurization steps. In order to achieve effective pressurization of the bed from the first or second end of the bed, the displacer is moved so as to establish substantially zero gas flow at respectively the second or first end of the bed while the pressure is being increased. Likewise, to achieve cocurrent depressurization, the displacer piston is moved so as to establish substantially zero gas flow at the first end of the bed while the pressure is being reduced; and to achieve countercurrent depressurization, the displacer piston is moved so as to establish substantially zero gas flow at the first end of the bed while the pressure is being reduced.

This aspect of the invention is a major advance over the prior art. A highly desirable PSA cycle for many applications includes pressurization initially from the first end of the bed and finally from the second end of the bed; and depressurization initially from the second end of the bed (cocurrent) and finally from the first end of the bed (countercurrent). The well known techniques for pressure equalization steps cannot achieve this PSA cycle because the pressurization and depressurization steps near the higher pressure or the lower pressure limits would be performed from the opposite ends of the bed. With flow modulation by displacer means, much greater flexibility to control the adsorbent bed flow pattern during pressurization and depressurization steps is provided.

FIG. 4

Pressure equalization steps in conventional PSA systems are performed either by connecting two adsorbent beds initially at different pressures so that they will equalize to an intermediate pressure, or connecting an adsorbent bed to equalize in pressure with a tank which will then be connected to a second adsorbent bed to equalize again at a lower intermediate pressure. Such equalization steps always entail substantial energy losses by irreversible free expansion across pressure differences when the equalization valves are opened, and also subject the valve seats to stresses and wear because of the severe duty of opening across a pressure difference.

Embodiment 130 illustrates a further aspect of the invention, in which a pressure modulation pump means is provided to generate cyclic pressure variations in the intermediate pressure manifolds so as to reduce pressure differences when valves are opened to connect adsorbent beds with the intermediate pressure manifolds. Since these valves no longer provide a function of pressure equalization by free expansion, they will here be called pressure modulation valves. Intermediate pressure manifold 110 communicates by pressure modulation valve 111 to second end 6, and by pressure modulation valve 112 to second end 8; and directly to pressure modulation chamber 131 The volume of pressure modulation chamber 131 is varied cyclically by piston 132 in cylinder 133 and driven by pressure modulation drive means 135, thus providing the pressure modulation pump means when the pressure modulation valves are operated as follows. When adsorbent bed 3 is undergoing a depressurization step, pressure modulation valve 111 is open and chamber 131 is being expanded by piston 132 so as to draw gas out of adsorbent bed 3 to reduce its pressure. Pressure modulation valve 111 will then be closed, and the pressure modulation valve (e.g. 112) to another adsorbent bed (e.g. 4) then at lower pressure will be opened so as to achieve a pressurization step of that bed by reverse motion of piston 132 to contract chamber 131 and thus compress gas into bed 4.

FIG. 5

The apparatus 150 is shown at a moment of its cycle when the working pressure of adsorbent bed 3 is the higher pressure of the cycle, and when the working pressure of adsorbent bed 4 is the lower pressure of the cycle. The adsorption module 2 may include other adsorbent beds (not shown) which at the same moment are undergoing pressurization or depressurization steps. For simplicity, the adsorbent bed work exchange means and associated valves are omitted from FIGS. 5 to 10, although it will be understood that any of the adsorbent bed work exchange means described for FIGS. 1 to 4 are applicable.

The feed gas mixture admitted from inlet 30 and conduit 31 is compressed by a first stage compressor 151 driven by motor 152. The gas mixture compressed by first stage compressor 151 is cooled by intercooler 153, and is then compressed to substantially the higher pressure of the pressure swing adsorption cycle by second stage feed compressor 155. The compression/expansion module 80 here includes second stage compressor 155 and expander 45, and may be provided as an industrial turbocharger or free rotor gas turbine.

FIG. 6

Apparatus 160 has no external heat source, but recovers heat of compression to cool gas entering the expander and uses the expansion cooling effect to cool the compressed feed gas entering the adsorbent beds. Except as follows, apparatus 160 resembles apparatus 150 of FIG. 5. Feed compressor 32 is coupled to expander 45 by shaft 46, and to motor 33. The feed gas mixture enters compressor 32 via conduit 31; and is compressed to the higher pressure and also heated by approximately adiabatic compression in compressor 32. The compressed and heated gas mixture delivered from compressor 32 is cooled by first heat exchanger 161, and then further cooled by heat exchanger 165, before entering condenser 36 and first inlet manifold 11. Second product reflux gas withdrawn by conduit 42 from second product manifold 14 is admitted to first heat exchanger 161, and is therein heated by heat exchange with the compressed feed gas mixture whose heat of compression is exchanged to the second product reflux gas The heated second product reflux gas passes from the first heat exchanger 161 to expander 45; and is expanded from substantially the higher pressure to the lower pressure, and is also cooled by approximately adiabatic expansion. The expanded and cooled second product reflux gas exits expander 45 by conduit 163 to second heat exchanger 165, and is there heated by heat exchange with the feed gas mixture being further cooled.

Embodiment 160 provides enhanced energy efficiency. The use of heat of compression to heat the second product reflux gas before expansion augments the power delivered by the expander 45 to assist compressor 32, thus reducing the power required from motor 33. Cooling of the compressed feed gas mixture in the second heat exchanger 165 by using the refrigeration effect of expander 45 improves the efficacy of condenser 36. Countercurrent heat exchange in the second heat exchanger 165, with a close thermal appproach between the expanded and cooled second product reflux gas entering exchanger 165 and feed gas mixture exiting exchanger 165, further enhances the cooling of the feed gas mixture before entering condenser 36; and has the further effect of depressing the temperature at the first end of the adsorbent beds relative to the temperature of the second end of the adsorbent beds, so as to establish a temperature gradient the adsorbent beds.

FIG. 7

Embodiment 170 expresses the invention in a form suitable for a vacuum swing adsorption cycle, for applications such as air purification to remove toxic vapours, or air separation to concentrate oxygen or nitrogen that may be delivered at substantially atmospheric pressure. The feed air is admitted by inlet 171 and feed conduit 172 to a feed blower 173. Feed blower 173 delivers the feed air to first inlet manifold 11 at the higher cycle pressure, which here may be approximately atmospheric pressure or a somewhat elevated pressure. The second product gas, either purified air or oxygen enriched air, is delivered at substantially the higher pressure from second product manifold 14 to a second product delivery conduit 175, optionally including a second product blower 176. Second product reflux gas is removed from the second product manifold 14 by conduit 42 to heater 43 and expander 45. Expander 45 reduces the pressure of the second product reflux gas from substantially the higher pressure to a lower cycle pressure which is subatmospheric, and the second product reflux gas after optional reheating by heater 51 is delivered by conduit 50 to the second inlet manifold 12 at the subatmospheric lower pressure.

First product gas, here either air with preferentially adsorbed vapours or nitrogen enriched air, is withdrawn at substantially the lower pressure from the first product manifold 13 by conduit 180 to exhaust pump 182, which compresses the first product gas to substantially atmospheric pressure for discharge through conduit 183. Exhaust pump 182 is driven through shaft 185 by expander 45, and through shaft 186 by motor 187.

FIG. 8

Embodiment 200 is adapted to separate a feed gas mixture, with the capability to deliver a first product gas highly purified in the first component, or a second product gas highly purified in the second component. This apparatus may also be operated to deliver simultaneously both first and second product gases moderately purified in the first and second components respectively, so that a binary mixture is nearly completely separated. A most useful application is to deliver one product gas highly purified in its desired component, while the other product is highly depleted in that component so as to achieve high recovery of the desired component. Thus, a feed gas mixture may contain hydrogen as the desired second component, and carbon oxides and methane together as the more readily adsorbed first component of the mixture. Here, it is desired to obtain highly pure hydrogen as the second product, and to minimize the hydrogen content of the first product which is the waste stream.

The adsorption module 2 is here modified to include a feed manifold 201 connected by a first feed valve 202 to feed port 203 of adsorbent bed 3, and by a second feed valve 204 to feed port 205 of adsorbent bed 4. The feed ports may be at either the first or second ends of the adsorbent beds, but in embodiment 200 are placed intermediately between the first and second ends of each adsorbent bed, or between first and second segments of each adsorbent bed. Thus, adsorbent bed 3 comprises a first segment 3a and a second segment 3b, and adsorbent bed 4 comprises first segment 4a and second segment 4b. Feed port 203 communicates with conduit 206 connecting adsorbent bed segments 3a and 3b, and feed port 205 communicates with conduit 207 connecting adsorbent bed segments 4a and 4b. The feed gas mixture is introduced from inlet 210 by infeed conduit 211 to the feed manifold 201. In the case that the second product is the desired product, the feed gas mixture will typically be introduced to the adsorbent beds at the higher pressure, so that feed valve 202 communicating to an adsorbent bed at the higher pressure is open, while feed valve 204 communicating to an adsorbent bed at the lower pressure is closed.

A portion of the first product gas reaching first product manifold 13 at substantially the lower pressure is used as first product reflux gas to the adsorbent beds, while the balance is delivered as the first product by first product delivery conduit 220. The first product reflux gas is withdrawn from first product manifold 13 by conduit 221 communicating to compressor 223 powered by motor 224 and expander 45. Compressor 223 compresses the first product reflux gas from the lower pressure to substantially the higher pressure. The first product reflux gas compressed by compressor 223 is cooled by cooler 225, thus rejecting heat of compression, and is conveyed by conduit 226 to first inlet manifold 11.

One important example of an exothermic chemical reaction with severe equilibrium constraints is the water gas shift reaction:

$$CO + H_2O \rightarrow CO_2 + H_2.$$

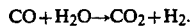

Using hydrophobic adsorbents such as silicalite or dealuminified Y zeolite, water vapour is less readily adsorbed than carbon dioxide. Then the strength of adsorption is in the sequence $CO_2 > H_2O$, $CO >> H_2$. This is an example of a reaction with a first product ($CO_2$) more readily adsorbed than the reactants ($H_2O$ and $CO_2$) and a second product ($H_2$) less readily adsorbed than the reactants. If a water gas shift catalyst (e.g. copper/zinc oxide) is interspersed with the hydrophobic adsorbent in a reaction zone of the adsorbent beds between the first and second ends, embodiment 200 may be used as a water gas shift reactor delivering concentrated product streams of hydrogen and carbon dioxide derived from a feed mixture containing steam and carbon monoxide, with substantially complete conversion of the feed carbon monoxide.

FIG. 9

Embodiment 250 is similar to embodiment 200 in the ability to separate two product gases purified in first and second components, and also includes provision to extract a third product stream which is enriched in a third component of the feed gas mixture, the third component being less readily adsorbed than the first component but more readily adsorbed than the second component. This third component will tend to accumulate in the concentration wavefront between the first and second components. At the higher pressure, the third component will be enriched relative to the first component; and at the lower pressure it will be enriched relative to the second component. Useful enrichment of the third component may be achieved at either the higher or the lower pressure by extracting the third product stream from an optimal zone of the concentration wavefront.

Feed gas mixture is admitted from infeed conduit 211 to feed manifold 201, and thence by feed valve 202 to feed port 203 in conduit 206 adjacent to adsorbent bed segment 3b, and by feed valve 204 to feed port 205 in conduit 207 adjacent to adsorbent bed segment 4b. The third product is withdrawn by a third product valve 254 from an extraction point in conduit 206 adjacent to adsorbent bed segment 3a, and by a third product valve 255 from an extraction point in conduit 207 adjacent to adsorbent bed segment 4a. The third product stream is delivered by valves 254 and 255 to third product manifold 256 and thence to third product delivery conduit 257. During the higher pressure step, the third product is extracted upstream of the feed injection point. Alternatively, the feed may be injected and the third product extracted during alternating cycles of the process.

Important applications for embodiment 250 are found in hydrogen production from syngas generated by steam reforming of natural gas, partial oxidation of hydrocarbons, or gasification of coal or biomass. The syngas generation process (e.g. a steam reformer, partial oxidation reactor or gasifier) produces syngas typically containing hydrogen, carbon dioxide, carbon monoxide, methane, and nitrogen. Production of purified hydrogen or ammonia synthesis gas typically includes steps of water gas shift reaction at high and low temperature to convert a portion of the carbon monoxide by reaction with steam to hydrogen plus carbon dioxide, followed by carbon dioxide removal and final purification. Pressure swing adsorption is now well accepted for carbon dioxide and hydrogen purification steps, but the conventional PSA process can only recover about 85% of the hydrogen in the PSA feed. Consequently, some 15% of the hydrogen plus the residual carbon monoxide are degraded to low BTU fuel values in the carbon dioxide rich low pressure exhaust stream from the PSA plant.

Fuderer (U.S. Pat. No. 4,553,981) has pointed out that most of the carbon dioxide could be scrubbed upstream of the conventional PSA system, whose low pressure exhaust stream would then be enriched in carbon monoxide and after recompression could be recycled to the syngas generation reactor or a water gas shift reactor to increase hydrogen yield. With the high pressure ratio typical of conventional hydrogen PSA systems, compression of the recycle carbon monoxide enriched stream is considerably costly. The present invention in embodiment 250 enables a preferable solution, since purified product streams of hydrogen and carbon dioxide are withdrawn simultaneously at respectively the higher and lower cycle pressures, while a third stream enriched in carbon monoxide and methane is delivered already at the higher pressure for recycle.

Figure 8:
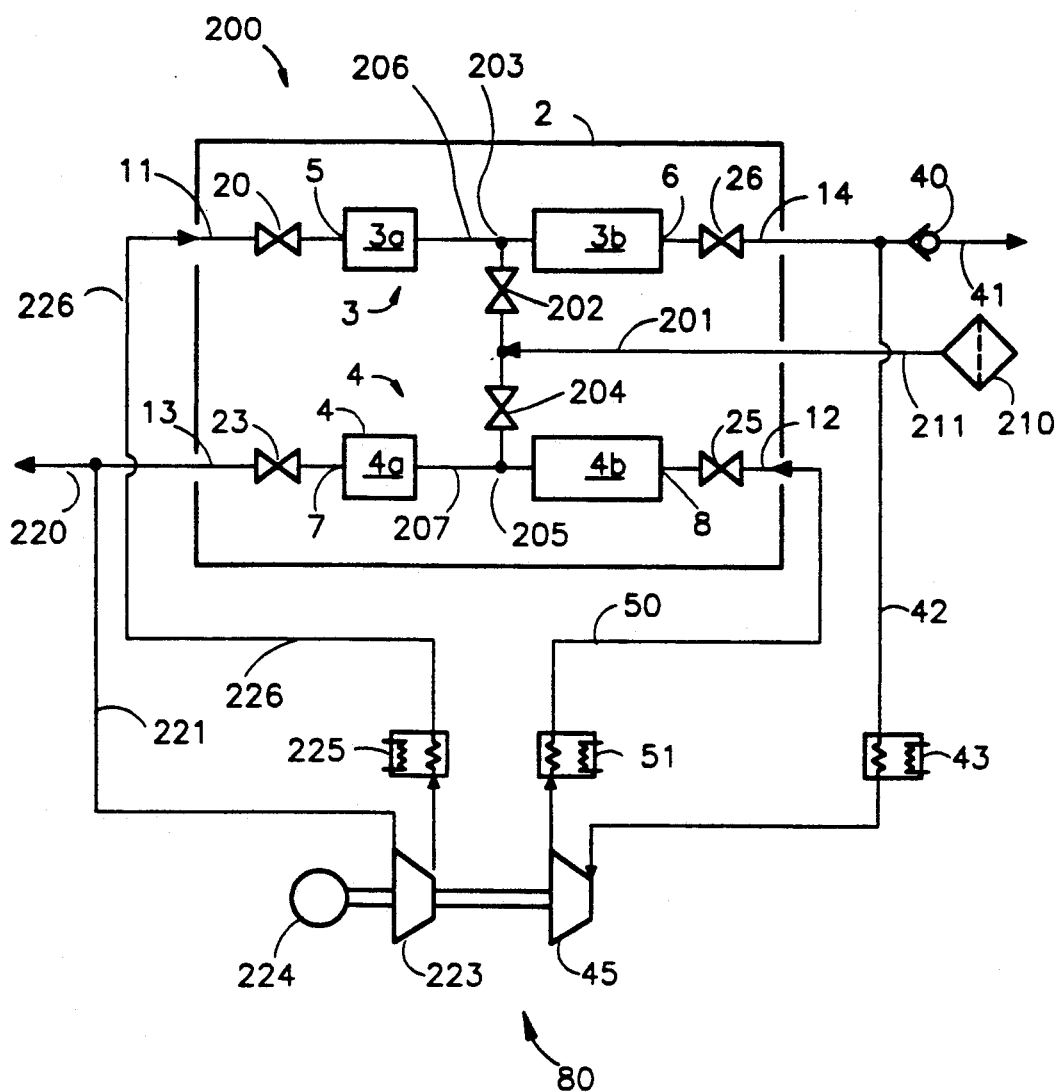
FIG. 8 is a simplified schematic of an apparatus for separating and concentrating both first and second components of a gas mixture.
Figure 9:
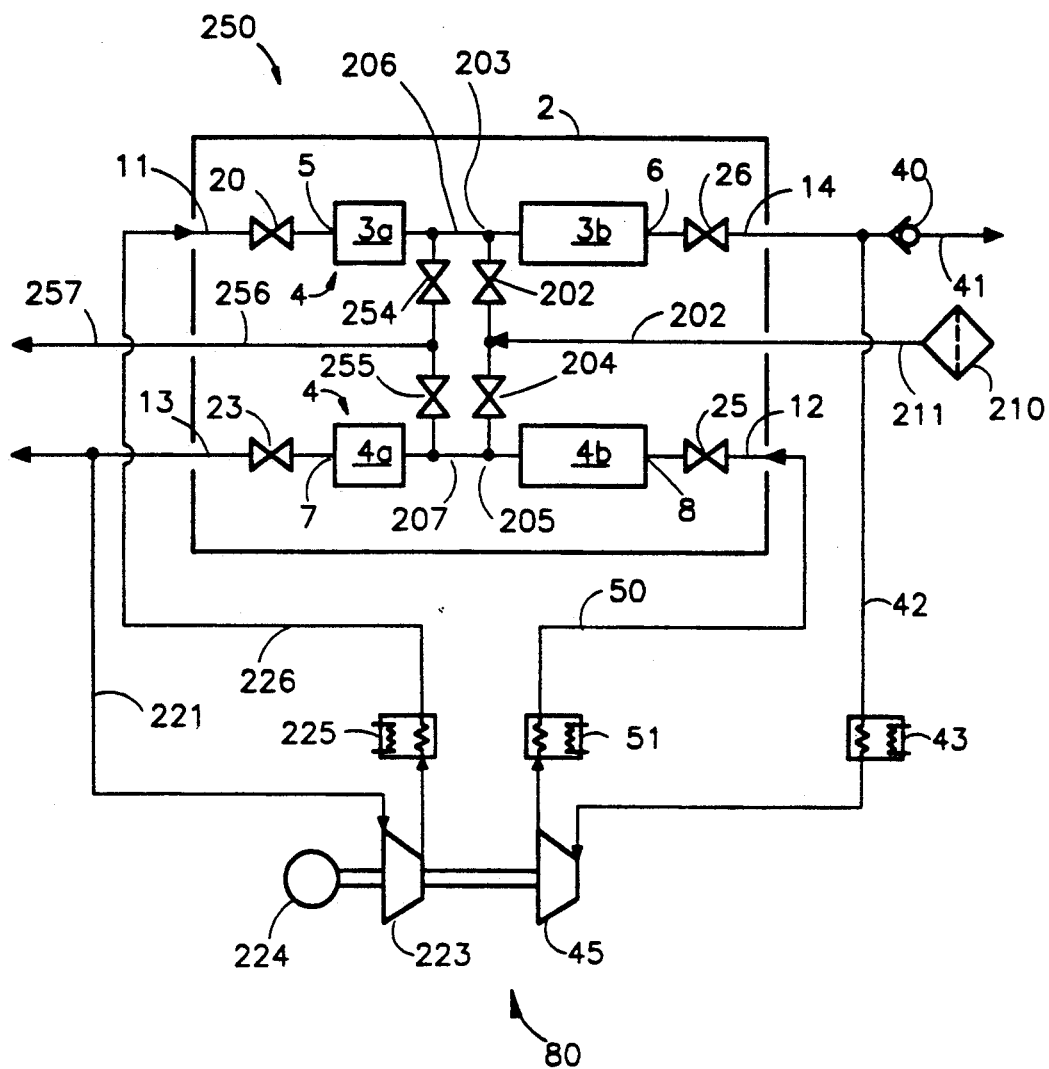
FIG. 9 shows an apparatus for separating two purified products and a third product stream from a multicomponent mixture.
Figure 10:
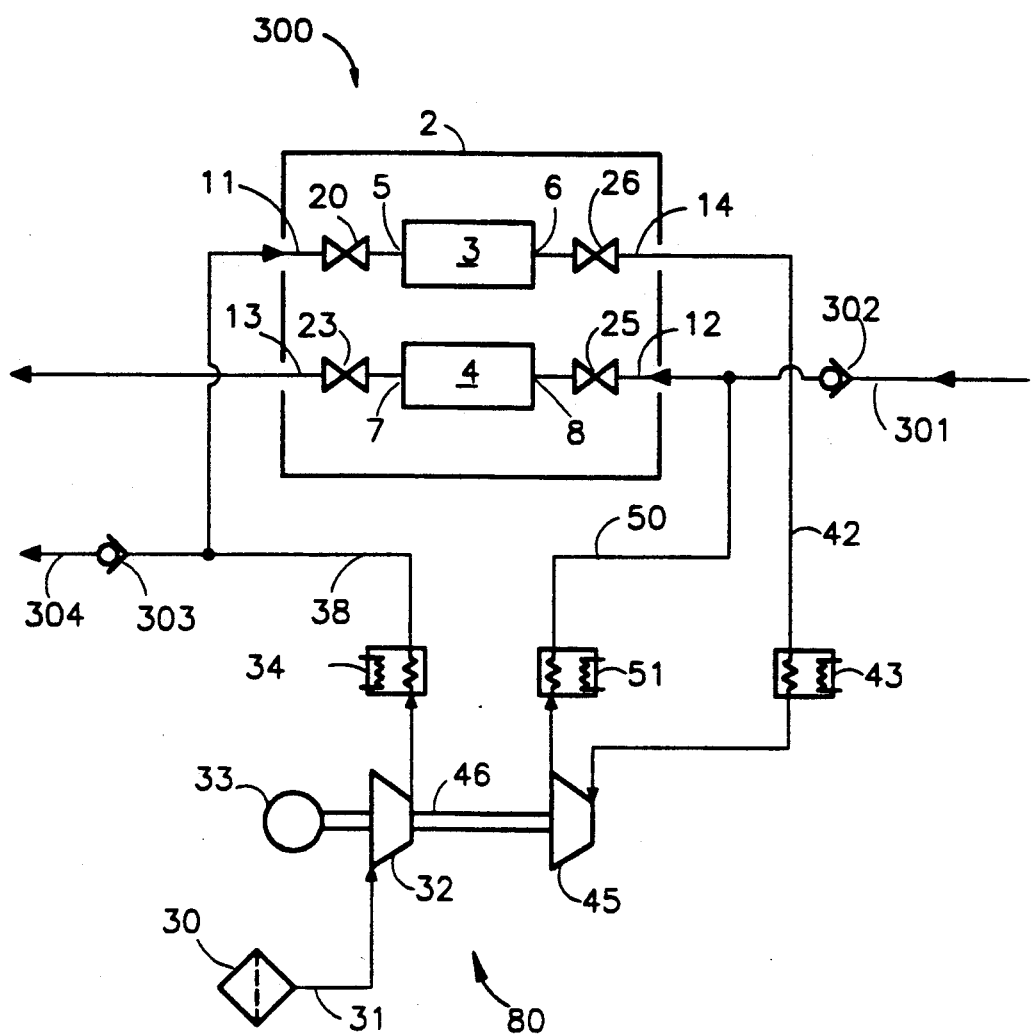
FIG. 10 shows an apparatus for generating power from the mixing of carbon dioxide into air.

Embodiment 250 could be used for the water gas shift reaction porcess discussed in regard to FIG. 8, with the difference that a conventional water gas shift reactor would be located externally to the apparatus 250. The effluent (containing $H_2$, $CO$, $CO_2$ and $H_2O$) from the water gas shift reactor is introduced as feed through conduit 211. Hydrogen product is delivered through conduit 41, while $CO_2$ product is delivered from first product manifold 13. The third product stream, enriched in steam and carbon monoxide, is recycled to the water gas shift reactor so that substantially complete conversion of carbon monoxide is ultimately achieved.

The important future process of hydrogen sulphide dissociation to produce sulphur plus coproduct hydrogen may be conducted using embodiment 250, operating the adsorbent beds at elevated temperature so that sulphur remains in vapour form within the apparatus. This is another example of a reaction with a first product ($S_n$) more readily adsorbed than the reactant ($H_2S$) and a second product ($H_2$) less readily adsorbed than the reactant. Here, the endothermic reaction may be conducted in reaction spaces associated with conduits 206 and 207 and thus within the adsorbent beds, with a fraction withdrawn as third product through conduit 257 for heating and stripping of accumulating feed impurities such as $CO_2$. Alternatively, the dissociation reaction may be conducted in an external reactor whose effluent is introduced through feed conduit 201, and a $H_2S$ depleted third product stream is recycled to the external reactor through conduit 257.

FIGS. 10 AND 11

The present invention achieves a close approach to thermodynamic reversibility for pressure swing adsorption, which previously had low energy efficiency. The minimum energy requirement to separate a gas mixture is that required for reversible isothermal compression of each component from its initial partial pressure to its final partial pressure. The present invention seeks to minimize irreversible expansions and other losses, so approaching ideal reversibility within limitations of component efficiencies, flow friction losses, heat exchanger differentials, and thermal and adsorption hysteresis effects.

It is interesting to consider the reverse application of recovering energy from the mixing of gases. An example of more than whimsical interest occurs in the venting of concentrated carbon dioxide streams into the atmosphere, whose background concentration of carbon dioxide is still so low as to be negligible in the present discussion. Concentrated carbon dioxide streams are produced in numerous applications for processing of fossil fuels, e.g. in the production of hydrogen or ammonia by steam reforming of natural gas or gasification of coal. While effluent carbon dioxide will be recovered for other applications where possible, and may even be deposited underground in the future to mitigate global warming; it has not been recognized that the theoretical energy of mixing pure carbon dioxide into the atmosphere is about 4.6% of the heat of combustion of carbon. Apparatus 300 resembles other PSA systems of this invention, and uses similar component nomenclature to embodiments 1 and 150. Concentrated carbon dioxide is introduced by conduit 301 and inlet valve 302 to the second inlet manifold 12, to flow from the second end to the first end of the adsorbent beds during the lower pressure step. Air is compressed into the apparatus at the higher pressure, and is introduced into the first inlet manifold 11 Some excess compressed air at the higher pressure may be delivered from conduit 38 through delivery valve 303 and conduit 304, representing a use of excess energy generated by the apparatus. The difference with the preceding gas separation applications is that here $CO_2$ as the more readily adsorbed component has been introduced at the second end to which the less readily adsorbed component is separated, while air as the less adsorbed component has been introduced at the first end; so that the normal concentration gradient in PSA has been inverted. While in normal PSA the concentration wavefront is steepened by parametric pumping so that a complete separation may be approached, here an inverted concentration profile is imposed. The PSA process will preferentially transport air to the first ends of the adsorbent beds, so the first product delivered at the higher pressure from the first product manifold will be carbon dioxide partially diluted with air. In the present embodiment, this first product gas is entirely used as first reflux gas. The first product gas is conveyed to expander 45 by conduit 42, heated and expanded to the lower pressure, and mixed with the feed carbon dioxide entering second inlet manifold 12. Air that was introduced to the adsorbent bed in the higher pressure step is mixed with now considerably diluted carbon dioxide refluxed, and is discharged from the first product manifold at the (atmospheric) lower pressure. The above described "reverse PSA" process mixes concentrated $CO_2$ with air, and is capable of delivering excess energy (either as compressed air delivered by conduit 304, or as electrical power generated by motor 33 acting as a generator) because the adsorbent bed is charged with rich $CO_2$ (feed plus second reflux) during the lower pressure step, and the steps of pressurization and depressurization have been achieved with energy exchanges approaching reversibility. During the higher pressure step, air is being compressed at the higher pressure into the adsorbent bed first end 5, while rich $CO_2$ is exiting second end 6 at almost the same pressure before being expanded. At constant pressure, the volumetric air flow at first end 5 is much smaller than the volumetric flow of carbon dioxide from second end 6 (even when both ends are at the same temperature) because of the differential uptake of strongly adsorbed $CO_2$ due to flow in the adsorbent bed displacing the concentration wavefront.

Figure 11:
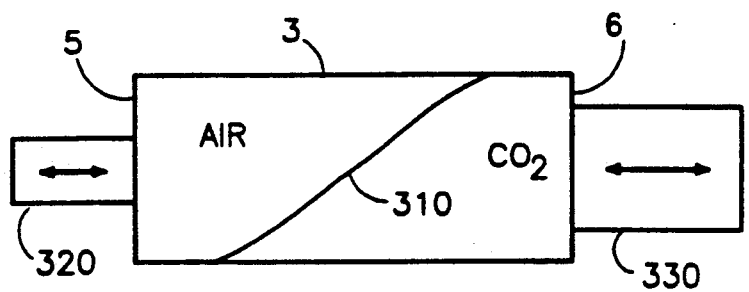
FIG. 11 shows relative volume displacements at either end of an adosrbent bed containing air and carbon dioxide
Figure 12:
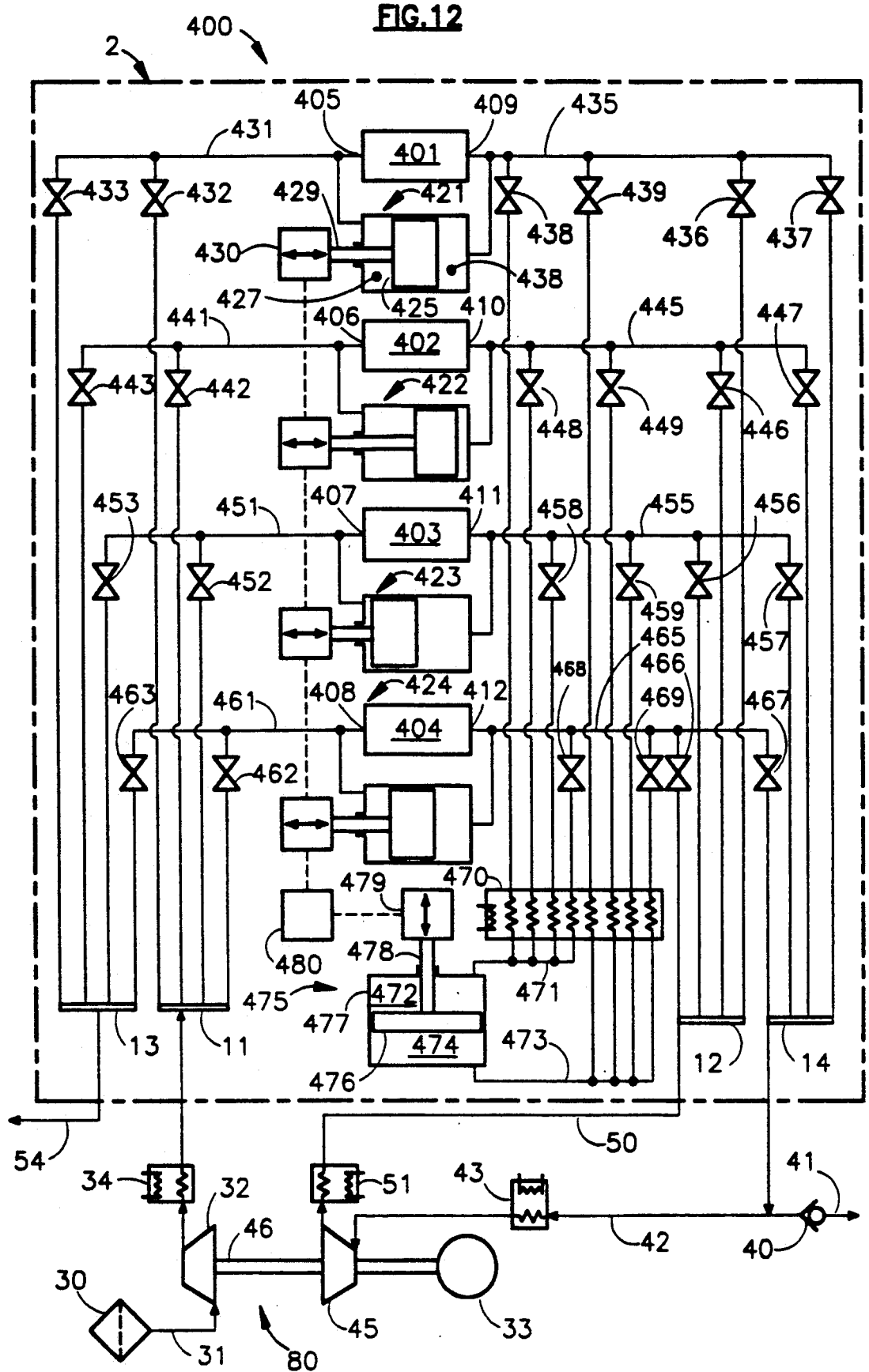
FIG. 12 shows an apparatus with four adsorbent beds.

FIG. 11 shows adsorbent bed 3, with a wavefront 310 that may represent either a concentration or a temperature gradient. Wavefront 310 may here define a concentration gradient between weakly adsorbed air and strongly adsorbed $CO_2$, as indicated. Then displacement at constant pressure of a small gas volume 320 in or out of the bed at first end 5 will result in displacement of a larger volume 330 at second end 6. It may be noted that an increased temperature at second end 6 relative to first end 5 will similarly result in larger gas volume displacements at the second end compared to the first end. Thus, thermal coupling is additive with the inverted concentration gradient in providing larger displacements at the second end compared to the first end. In exact analogy to gas turbines, it is the greater volume of displacements or flows at the second end of a thermal regenerator (or an adsorbent bed also serving as a regenerator) relative to displacements or flows at the first end, which enables the expander expanding the larger second end flow to deliver net useful power after driving compression of the volumetrically smaller first end flow.

In the case of normal PSA performing gas separations, the concentration profile shown in FIG. 11 will be reversed, with the heavy component concentrated at the first end and the light component concentrated at the second end. With the second end maintained at a higher temperature than the first end, the temperature and concentration gradients will have opposed effects, so that thermal coupling will offset the difference in volumetric displacements between the two ends of the bed that would be caused by adsorption effects at constant temperature. This analogy helps explain how thermal coupling (with the second end of the adsorbent bed heated relative to the first end) can power PSA processes of the present invention.

FIG. 12

With more adsorbent beds, a plurality of intermediate pressure manifolds operating at different intermediate pressures between the higher and lower cycle pressures can be provided. Pressure equalization steps in conventional PSA systems are performed either by connecting two adsorbent beds initially at different pressures so that they will equalize to an intermediate pressure, or connecting an adsorbent bed to equalize in pressure with a tank which will then be connected to a second adsorbent bed to equalize again at a lower intermediate pressure. Such equalization steps always entail substantial energy losses by irreversible free expansion across pressure differences when the equalization valves are opened, and also subject the valve seats to stresses and wear because of the severe duty of opening across a pressure difference.

A single pressure modulation pump and its intermediate pressure manifold may provide pressurization and depressurization steps for "N" adsorbent beds operating out of phase. The pressure modulation pump will then operate at a cyclic frequency "N" times the cyclic frequency of the PSA process. Multiple pressure modulation pumps and their intermediate pressure manifolds may be staged to provide stepwise the full pressure range between higher and lower cycle pressures.

It will be evident from the following description that the pressure modulation pump serves the purpose of more efficiently recovering energy from a depressurization step of an adsorbent bed over an intermediate pressure interval between the higher and lower pressures, to assist performing a pressurization step over an intermediate pressure interval for another of the adsorbent beds.

Embodiment 400 has four adsorbent beds 401, 402, 403 and 404. Each adsorbent bed has a first end 405, 406, 407 or 408, and a second end 409, 410, 411 or 412. A displacer means 421, 422, 423 and 424 cooperates with each adsorbent bed. As described for displacer means 421, displacer piston 425 reciprocating in cylinder 426 defines a first chamber 427 communicating to adsorbent bed first end 405, and a second chamber 428 communicating to second end 409. The displacer piston 425 is driven through displacer piston rod 429 by drive means 430.

Adsorbent bed 401 communicates at its first end 405 by conduit 431 to first inlet valve 432, first product valve 433 and first chamber 427; and at its second end 409 by conduit 435 to second chamber 428, second inlet valve 436, second product valve 437, first pressure modulation valve 438 and second pressure modulation valve 439. Adsorbent bed 402 communicates at its first end 406 by conduit 441 to first inlet valve 442 and first product Valve 443; and at its second end 410 by conduit 445 to second inlet valve 446, second product valve 447, first pressure modulation valve 448 and second pressure modulation valve 449. Adsorbent bed 403 communicates at its first end 407 by conduit 451 to first inlet valve 452 and first product valve 453; and at its second end 411 by conduit 455 to second inlet valve 456, second product valve 457, first pressure modulation valve 458 and second pressure modulation valve 459. Adsorbent bed 404 communicates at its first end 408 by conduit 461 to first inlet valve 462 and first product valve 463; and at its second end 412 by conduit 465 to second inlet valve 466, second product valve 467, first pressure modulation valve 468 and second pressure modulation valve 469.

The first pressure modulation valves communicate through heat exchanger 470 to a first pressure modulation manifold 471 and to a first pressure modulation chamber 472, and the second pressure modulation valves communicate through heat exchanger 470 to a second pressure modulation manifold 473 and to a first pressure modulation chamber 474. The pressure modulation pump means 475 includes chambers 472 and 474, defined by double-acting piston 476 in cylinder 477 and by piston rod 478 connecting piston 476 to reciprocating drive means 479. Control means 480 coordinates the phase and operating frequency of the pressure modulation pump, the displacers, and the valves.

The first inlet valves communicate to first inlet manifold 11, the first product valves to first product manifold 13, the second product valves to second product manifold 14, and the second inlet valves to second inlet manifold 12.

INDUSTRIAL APPLICABILITY

The present invention is applicable to air separation, hydrogen separation, and likewise to many other gas or vapour separations. The invention overcomes barriers to the technical simplification an economic scale-up of highly efficient and productive gas separation equipment. For larger scale applications of the present invention, attractive economies of scale are enabled by use of centrifugal or axial compressors and turbines.

Desirable applications for the present invention arise with chemical processes where the PSA. separation can remove the desired product(s) from the reaction space, while trapping the reactant(s) as well as any reversibly formed and undesired reaction byproducts in the reaction space, so that the reaction will proceed to completion with ideally 100% conversion of feedstock and 100% selectivity. In many processes, high yield of the valuable product cannot be obtained because of equilibrium constraints. Often equilibrium constraints and kinetic factors mean that accumulation of the desired product will inhibit its further production, especially for exothermic reactions where the equilibrium is less favourable at higher temperatures which may be required to obtain useful reaction rates. Consequently, many processes are inefficient in their yield of desired products from valuable feedstocks; and this inefficiency may be reflected in noxious discharges to the environment.

In order to force a reaction against equilibrium constraints to achieve higher conversion per pass, it is common practice to operate at very high pressures to force reactions such as ammonia synthesis, or to very high temperatures to force endothermic reactions such as ammonia or hydrogen sulphide dissociation. By combining the PSA separation principle with a chemical process, the reaction can be conducted with high yield under milder conditions because the reaction products are continually removed. The present invention provides means to separate chemically reactive mixtures, to enhance the yield of desired product while performing the reaction under mild pressure or temperature conditions.

As further discussed in copending application "Pressure Swing Adsorption Gas Separation", the present invention may also be applied advantageously to gas phase electrochemical processes, where equilibrium constraints may be reflected in a higher voltage being needed to perform an electrolytic reaction, or in a lower voltage being generated by a high temperature fuel cell. The invention thus provides means to separate the reactant(s) and product(s) of a gas or vapour phase electrochemical reaction, so as to reduce the voltage of an electrolytic process and increase the voltage of a fuel cell.

Efficient recovery is achieved of expansion energy dissipated in depressurization steps of prior art pressure swing adsorption processes. The present invention enables use of thermal energy for direct powering of gas separation processes. Thermal energy used as a power source for the present process may include low grade heat such as heat of compression. Thus, industrial air separation and hydrogen recovery from low BTU syngas may be substantially powered by low grade heat.

It will be understood that the different aspects of the present invention may be expressed with much diversity and in many combinations other than the specific examples described above, under the scope of the following claims.

I claim:

1. A process for separating first and second components of a gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency defining a cycle period; providing for the process a plurality of adsorbent beds of the adsorbent material with a number "N" of substantially similar adsorbent beds, and said adsorbent beds having first and second ends; and the process including in each adsorbent bed the cyclically repeated steps at the cyclic frequency and in some sequence of:

(A) introducing the gas mixture to the adsorbent bed, (B) generating cyclic pressure changes in the adsorbent bed, in a pressurization step increasing the working pressure of the adsorbent bed, and in a depressurization step decreasing the working pressure of the adsorbent bed, thus changing the working pressure of the adsorbent bed between the lower and higher pressures, (C) generating cyclically reversing flow of the gas mixture in the adsorbent bed, while establishing a relative phase between the reversing flow and the said pressure changes in the adsorbent bed, (D) generating gas flow in the adsorbent bed directed toward the first end of the adsorbent bed when the pressure is approximately the lower pressure, so that a first product gas enriched in the first component flows from the first end of the adsorbent bed at substantially the lower pressure, (E) generating gas flow in the adsorbent bed directed toward the second end of the adsorbent bed when the pressure is approximately the higher pressure, so that a second product gas enriched in the second component flows from the second end of the adsorbent bed at substantially the higher pressure, and the process is further characterized by:

(F) recovering energy from a depressurization step of the adsorbent bed to assist performing the pressurization step of another of the adsorbent beds, (G) collecting as second product reflux gas a portion of the second product gas which has flowed from the second ends of the "N" adsorbent beds in above step (E) for each of the adsorbent beds, providing heat to the second product reflux gas at substantially the higher pressure, expanding the second product reflux from the higher to the lower pressure, and admitting the second product reflux gas to the second end of an adsorbent bed during step (D) for that adsorbent bed, (H) recovering mechanical energy from expanding the second product reflux gas in above step (G), and (I) maintaining the first end of the adsorbent bed at substantially a first temperature, and maintaining the second end of the adsorbent bed at substantially a second temperature.

2. The process of claim 1, in which steps (A) to (F) inclusive are conducted successively in the "N" adsorbent beds, in different phases separated by a fraction "1/N" of the cycle period.

3. The process of claim 1, further characterized by:

(J) recovering energy from a depressurization step of the adsorbent bed over an intermediate pressure interval between the higher and lower pressures to assist performing the pressurization step over substantially the same pressure interval of another of the adsorbent beds, (K) providing an intermediate pressure manifold to accept gas in turn from each adsorbent bed during a depressurization step of that adsorbent bed and to supply that gas to another adsorbent bed during a pressurization step of that adsorbent bed, thus exchanging gas between the adsorbent beds, and (L) modulating the pressure of the intermediate pressure manifold so as to cyclically vary the pressure of the intermediate pressure manifold within the intermediate pressure interval, so that the pressure in the intermediate pressure manifold is decreasing when the intermediate pressure manifold is accepting gas from an adsorbent bed during a depressurization step for that adsorbent bed, and the pressure in the intermediate pressure manifold is increasing when the intermediate pressure manifold is supplying gas to an adsorbent bed during a depressurization step for that adsorbent bed.

4. The process of claim 3, in which step (L) is performed at a pressure modulation cyclic frequency which is "N" times the cyclic frequency of the process, and a pressure modulation period is defined as "1/N" of the process cycle period.

5. The process of claim 4, in which the peak to peak range of pressure variations in the intermediate pressure manifold in step (L) approximately span the intermediate pressure interval.

6. The process of claim 4, in which the pressure range between the higher pressure and the lower pressure is spanned by a number "M" of intermediate pressure intervals, further characterized by:

(a) providing an intermediate pressure manifold for each intermediate pressure interval, (b) performing step (L) in opposite phase in adjacent intermediate pressure intervals.

7. The process of claim 6, in which the peak to peak range of pressure variations in each intermediate pressure manifold in step (L) approximately spans that intermediate pressure interval, so that the pressure in adjacent intermediate pressure manifolds is approximately equalized once each pressure modulation cycle period.

8. The process of claim 6, further characterized by:

(a) performing step (D) over a time interval approximately "D" times the pressure modulation period, where "D" is an integer, (b) performing step (E) over a time interval approximately "E" times the pressure modulation period, where "E" is an integer, and (c) $N = \{M + D + E\}$.

9. The process of claim 2, further characterized by:

(L) recovering energy from a depressurization step of the adsorbent bed over an intermediate pressure interval between the higher and lower pressures to assist performing a pressurization step of another of the adsorbent beds, (M) providing an intermediate pressure manifold to accept gas in turn from each adsorbent bed during a depressurization step of that adsorbent bed and to supply that gas to another adsorbent bed during a pressurization step of that adsorbent bed, thus exchanging gas between the adsorbent beds, and (N) modulating the flow in the adsorbent bed during pressurization and depressurization steps, so that a condition of approximately zero flow may be established at either end of the bed.

10. The process of claim 9, further modulating the flow in the adsorbent bed during pressurization steps so that the flow is approximately zero at the first end of the bed during initial pressurization from the lower pressure, and the flow is approximately zero at the second end of the bed during final pressurization approaching the higher pressure.

11. The process of claim 9, further modulating the flow in the adsorbent bed during depressurization steps so that the flow is approximately zero at the second end of the bed during initial depressurization from the higher pressure, and the flow is approximately zero at the first end of the bed during final depressurization approaching the lower pressure.

12. The process of claim 2, in which the gas mixture is chemically reactive and a chemical reaction is performed within the process.

13. The process of claim 12, in which the adsorbent is hydrophobic, the first component is carbon dioxide, and the second component includes hydrogen, carbon monoxide and water vapour, and the chemical reaction is the water gas shift reaction.

14. The process of claim 2, in which the gas mixture is introduced to a point intermediate between the first and second ends of the adsorbent beds, so that the second product gas is substantially purified in the second component and the second component is substantially removed from the first product gas.

15. The process of claim 14, in which the gas mixture contains a third component which is more readily adsorbed than the second component and less readily adsorbed than the first component, and further withdrawing a third product stream enriched in the third component from a point intermediate between the first and second ends of the adsorbent beds.

16. The process of claim 15, in which the adsorbent is hydrophobic, the first component is carbon dioxide, the second component is hydrogen, and the third component includes both carbon monoxide and water vapour.

17. The process of claim 16, in which the gas mixture is syngas converted from a fossil fuel in a syngas generator, and at least a portion of the third product stream is withdrawn at the higher pressure and recycled to the syngas generator so as to obtain improved yield of hydrogen.

18. The process of claim 14 conducted at an elevated temperature such that sulphur remains in the vapour phase at the higher pressure, and in which the first component is sulphur vapour, the second component is hydrogen, and hydrogen sulphide is a third component more readily adsorbed than the second component and less readily adsorbed than the first component, and further characterized by introducing the third component to a point intermediate between the first and second ends of the adsorbent ends so as to produce hydrogen and sulphur by dissociation of hydrogen sulphide.

19. The process of claim 1, further using mechanical energy recovered in step (H) as compression energy for the process.

20. The process of claim 19, further characterized by:
(a) compressing the first product gas from the lower pressure to a discharge pressure higher than the lower pressure, using mechanical energy recovered in step (H).

21. The process of claim 20, in which the lower pressure is subatmospheric, and the discharge pressure is substantially atmospheric pressure.

22. The process of claim 19, further characterized by:
(a) compressing the first product gas from substantially the higher pressure to a delivery pressure above the higher pressure, using mechanical energy recovered in step (H).

23. The process of claim 22, further characterized by:
(a) cooling the gas mixture to remove heat of compression, after the gas mixture has been compressed and before introducing the gas mixture to the adsorbent beds.

24. The process of claim 23, further heating the second product reflux gas before expansion in step (G) and cooling the gas mixture after compression by heat exchange between the second product reflux gas and the compressed gas mixture.

25. The process of claim 24, further reheating the second product reflux gas after expansion and before admitting it at the lower pressure to the second end of the adsorbent bed.

26. The process of claim 19, in which the gas mixture is supplied to the process at a feed supply pressure less than the higher pressure, and further characterized by:
(a) compressing the gas mixture from substantially the feed supply pressure to substantially the higher pressure, using mechanical energy recovered in step (H), and
(b) introducing the gas mixture to each adsorbent bed at substantially the higher pressure.

27. The process of claim 19, further modulating the flow in the adsorbent bed during pressurization and depressurization steps (B).

28. The process of claim 1, further establishing an axial temperature gradient in the adsorbent beds with the second temperature higher than the first temperature.

29. Apparatus for separating first and second components of a gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency, the apparatus including:
(a) a plurality of "N" substantially similar adsorbent beds of the adsorbent material, each adsorbent bed having a first end and a second end,
(b) means to generate cyclic pressure changes in each adsorbent bed at a cyclic frequency, in a pressurization step increasing the working pressure of the adsorbent bed, and in a depressurization step decreasing the working pressure of the adsorbent bed, so as to change the working pressure of the adsorbent bed between the lower and higher pressures,
(c) means to generate a cyclically reversing flow of the gas mixture in each adsorbing bed at the cyclic frequency, cooperating with the means to generate cyclic pressure changes so as to establish a relative phase between the reversing flow and the pressure changes in each adsorbent bed,
(d) means to generate gas flow in each adsorbent bed directed toward the first end of the adsorbent bed when the pressure is approximately the lower pressure, and means to generate gas flow in each adsorbent bed directed toward the second end of the adsorbent bed when the pressure is approximately the higher pressure,
(e) feed supply means to introduce the gas mixture to each of the said adsorbent beds,
(f) first product valve means to remove a first product gas enriched in the first component from the first end of each adsorbent bed, and second product valve means to deliver a second product gas enriched in the second component from the second end of each adsorbent bed,
(g) first inlet valve means to admit gas to the first end of each adsorbent bed at substantially the higher pressure, and second inlet valve means to admit gas to the second end of each adsorbent bed at substantially the lower pressure,
and the apparatus is further characterized by:
(h) work energy exchange means to recover energy from a depressurization step of an adsorbent bed to assist performing the pressurization step of another of the adsorbent beds,
(i) means to provide heat to a second product reflux gas at substantially the higher pressure, the second product reflux gas being a portion of the second product gas delivered from the second product valve means,
(j) expander means to expand the second product reflux gas which has been heated by the heater means, from substantially the higher to the lower pressure,
(k) compressor means cooperating with the first ends of the adsorbent beds, and cooperating with the work energy exchange means and the expander means to establish a pressure ratio between the higher and lower pressures,
(l) means to recover mechanical power from the expander means to assist driving the compressor means, and
(m) means to establish the first end of the bed at substantially a first temperature, and to establish the second end of the bed at substantially a second temperature.

30. The apparatus of claim 29, further including for each adsorbent bed:
(a) a first cyclic volume displacement means, including a first chamber communicating with the first end of the adsorbent bed, and drive means to change the volume of the chamber at the cyclic frequency.

31. The apparatus of claim 29, further including for each adsorbent bed:

(a) a second cyclic volume displacement means, including a second chamber communicating with the second end of the adsorbent bed, and drive means to change the volume of the chamber at the cyclic frequency.

32. The apparatus of claim 29, further including for each adsorbent bed:
(a) first and second cyclic volume displacement means, including a first chamber communicating with the first end of the adsorbent bed and a second chamber communicating with the second end of the adsorbent bed, and drive means to change the volume of the chambers at the cyclic frequency and with a relative phase between the changes of volume in the chambers.

33. The apparatus of claim 32, in which the relative phase between the changes of volume in the first and second chambers is 180°.

34. Apparatus for separating first and second components of a gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a process cyclic frequency, the apparatus including:
(a) a plurality of "N" substantially similar adsorbent beds of the adsorbent material, each adsorbent bed having a first end and a second end,
(b) means to generate cyclic pressure changes in each adsorbent bed at a cyclic frequency, in a pressurization step increasing the working pressure of the adsorbent bed, and in a depressurization step decreasing the working pressure of the adsorbent bed, so as to change the working pressure of the adsorbent bed between the lower and higher pressures,
(c) means to generate cyclically reversing flow of the gas mixture in each adsorbent bed at the cyclic frequency, cooperating with the means to generate cyclic pressure changes so as to establish a relative phase between the reversing flow and the pressure changes in each adsorbent bed,
(d) means to generate gas flow in each adsorbent bed directed toward the first end of the adsorbent bed when the pressure is approximately the lower pressure, and means to generate gas flow in each adsorbent bed directed toward the second end of the adsorbent bed when the pressure is approximately the higher pressure,
(e) feed supply means to introduce the gas mixture to each of the said adsorbent beds,
(f) first product valve means to remove a first product gas enriched in the first component from the first end of each adsorbent bed, and second product valve means to deliver a second product gas enriched in the second component from the second end of each adsorbent bed,
(g) first inlet valve means to admit gas to the first end of each adsorbent bed at substantially the higher pressure, and second inlet valve means to admit gas to the second end of each adsorbent bed at substantially the lower pressure,
and the apparatus is further characterized by:
(h) an intermediate pressure manifold with pressure modulation valve means to accept gas in turn from each adsorbent bed during a depressurization step of that adsorbent bed and to supply that gas to another adsorbent bed during a pressurization step of that adsorbent bed, thus exchanging gas between the adsorbent beds, and
(i) pressure modulation pump means for the intermediate pressure manifold to cyclically vary the pressure of the intermediate pressure manifold within the intermediate pressure interval, so that the pressure in the intermediate pressure manifold is decreasing when the intermediate pressure manifold is accepting gas from an adsorbent bed during a depressurization step for that adsorbent bed, and the pressure in the intermediate pressure manifold is increasing when the intermediate pressure manifold is supplying gas to an adsorbent bed during a pressurization step for that adsorbent bed, so as to recover energy from a depressurization step of an adsorbent bed over an intermediate pressure interval between the higher and lower pressures to assist performing a pressurization step over an intermediate pressure interval for another of the adsorbent beds.

35. The apparatus of claim 34, with means to operate the the pressure modulation means of the intermediate pressure manifold at a pressure modulation cyclic frequency which is "N" times the process cyclic frequency.

36. The apparatus of claim 34, with the pressure range between the higher pressure and the lower pressure spanned by a number "M" of intermediate pressure intervals, further characterized by including:
(a) an intermediate pressure manifold for each of the "M" intermediate pressure intervals,
(b) pressure modulation means for each of the intermediate pressure manifolds, and
(c) means to coordinate the phase of the pressure modulation means so that the pressure modulation means of adjacent pressure intervals cyclically vary the pressures of their intermediate pressure manifolds in opposite phase.

37. The apparatus of claim 36, with flow modulation means to modulate the flow in the adsorbent bed during pressurization and depressurization steps 38. The apparatus of claim 37, in which the flow modulation means is provided as displacer means defining a first chamber communicating to the first end of the adsorbent bed and a second chamber communicating to the second end of the adsorbent bed, and means to vary the volumes of the first and second chambers in opposite phase.

39. The apparatus of claim 38, in which the displacer is further characterized by having a smaller displacement of the second chamber relative to the displacement of the first chamber.

40. Apparatus for separating first and second components of a gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a process cyclic frequency, the apparatus including:
(a) a plurality of "N" substantially similar adsorbent beds of the adsorbent material, each adsorbent bed having a first end and a second end,
(b) means to generate cyclic pressure changes in each adsorbent bed at a cyclic frequency, in a pressurization step increasing the working pressure of the adsorbent bed, and in a depressurization step decreasing the working pressure of the adsorbent bed, so as to change the working pressure of the adsorbent bed between the lower and higher pressures,
(c) means to generate cyclically reversing flow of the gas mixture in each adsorbent bed at the cyclic frequency, cooperating with the means to generate cyclic pressure changes so as to establish a relative phase between the reversing flow and the pressure changes in each adsorbent bed,
(d) means to generate gas flow in each adsorbent bed directed toward the first end of the adsorbent bed when the pressure is approximately the lower pressure, and means to generate gas flow in each adsorbent bed directed toward the second end of the adsorbent bed when the pressure is approximately the higher pressure,
(e) feed supply means to introduce the gas mixture to each of the said adsorbent beds,
(f) means to remove a first product gas enriched in the first component from the first end of each adsorbent bed, and means to deliver a second product gas enriched in the second component from the second end of each adsorbent bed,
(g) first inlet valve means to admit gas to the first end of each adsorbent bed at substantially the higher pressure, and second inlet valve means to admit gas to the second end of each adsorbent bed at substantially the lower pressure,
and the apparatus further includes:
(h) means to recover energy from a depressurization step of the adsorbent bed over an intermediate pressure interval between the higher and lower pressures to assist performing a pressurization step over substantially the same pressure interval of another of the adsorbent beds,
(i) an intermediate pressure manifold with valve means to accept gas in turn from each adsorbent bed during a depressurization step of that adsorbent bed and to supply that gas to another adsorbent bed during a pressurization step of that adsorbent bed, thus exchanging gas between the adsorbent beds, and
(j) flow modulation means to modulate the flow in the adsorbent bed during pressurization and depressurization steps.

41. The apparatus of claim 40, in which the flow modulation means is provided as displacer means defining a first chamber communicating to the first end of the adsorbent bed and a second chamber communicating to the second end of the adsorbent bed, and means to vary the volumes of the first and second chambers in opposite phase.

42. Apparatus for separating first and second components of a gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a process cyclic frequency, the apparatus including:
(a) a plurality of "N" substantially similar adsorbent beds of the adsorbent material, each adsorbent bed having a first end and a second end,
(b) means to generate cyclic pressure changes in each adsorbent bed at a cyclic frequency, in a pressurization step increasing the working pressure of the adsorbent bed, and in a depressurization step decreasing the working pressure of the adsorbent bed, so as to change the working pressure of the adsorbent bed between the lower and higher pressures,
(c) means to generate cyclically reversing flow of the gas mixture in each adsorbent bed at the cyclic frequency, cooperating with the means to generate cyclic pressure changes so as to establish a relative phase between the reversing flow and the pressure changes in each adsorbent bed,
(d) means to generate gas flow in each adsorbent bed directed toward the first end of the adsorbent bed when the pressure is approximately the lower pressure, and means to generate gas flow in each adsorbent bed directed toward the second end of the adsorbent bed when the pressure is approximately the higher pressure,
(e) feed supply means to introduce the gas mixture to each of the said adsorbent beds,
(f) means to remove a first product gas enriched in the first component from the first end of each adsorbent bed, and means to deliver a second product gas enriched in the second component from the second end of each adsorbent bed,
(g) first inlet valve means to admit gas to the first end of each adsorbent bed at substantially the higher pressure, and second inlet valve means to admit gas to the second end of each adsorbent bed at substantially the lower pressure,
further characterized in that the means to generate gas flow in each adsorbent bed directed toward the first end of the adsorbent bed when the pressure is approximately the lower pressure, and the means to generate gas flow in each adsorbent bed directed toward the second end of the adsorbent bed when the pressure is approximately the higher pressure, include an expander and a compressor which are mechanically coupled as a compressor/expander combination.

43. Apparatus for generating energy by mixing of first and second gas components, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency, the apparatus including:
(a) a plurality of "N" substantially similar adsorbent beds of the adsorbent material, each adsorbent bed having a first end and a second end, (b) means to generate cyclic pressure changes in each adsorbent bed at a cyclic frequency, in a pressurization step increasing the working pressure of the adsorbent bed, and in a depressurization step decreasing the working pressure of the adsorbent bed, so as to change the working pressure of the adsorbent bed between the lower and higher pressures, (c) means to generate cyclically reversing flow of the gas mixture in each adsorbent bed at the cyclic frequency, cooperating with the means to generate cyclic pressure changes so as to establish a relative phase between the reversing flow and the pressure changes in each adsorbent bed, (d) means to generate gas flow in each adsorbent bed directed toward the first end of the adsorbent bed when the pressure is approximately the lower pressure, and means to generate gas flow in each adsorbent bed directed toward the second end of the adsorbent bed when the pressure is approximately the higher pressure, (e) a second inlet valve means to admit a first feed stream containing the first component to adjacent the second end of the adsorbent beds at the lower pressure, (f) a first inlet valve means to admit a second feed stream containing the second component to adjacent the first end of the adsorbent beds at the higher pressure, (g) exhaust valve means deliver a gas mixture of the first and second components from adjacent the first end of the adsorbent beds at the lower pressure, (h) work energy exchange means to recover energy from a depressurization step of an adsorbent bed to assist performing the pressurization step of another of the adsorbent beds, (i) expander means to expand gas flowing from the second end of the adsorbent beds from substantially the higher to the lower pressure, and means to return that gas to the second ends of the adsorbent beds, (j) compressor means compressing the second feed stream to the higher pressure, and (k) means to recover mechanical power from the expander means to assist driving the compressor means, and to provide useful energy.

* * * * *